United States Patent
Visco et al.

(10) Patent No.: US 9,123,941 B2
(45) Date of Patent: *Sep. 1, 2015

(54) PROTECTED ACTIVE METAL ELECTRODE AND BATTERY CELL STRUCTURES WITH NON-AQUEOUS INTERLAYER ARCHITECTURE

(71) Applicant: PolyPlus Battery Company, Berkeley, CA (US)

(72) Inventors: Steven J. Visco, Berkeley, CA (US); Bruce D. Katz, Moraga, CA (US); Yevgeniy S. Nimon, Danville, CA (US); Lutgard C. De Jonghe, Lafayette, CA (US)

(73) Assignee: PolyPlus Battery Company, Berkeley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/449,040

(22) Filed: Jul. 31, 2014

(65) Prior Publication Data

US 2015/0024251 A1     Jan. 22, 2015

Related U.S. Application Data

(60) Continuation of application No. 13/929,653, filed on Jun. 27, 2013, now Pat. No. 8,828,580, which is a continuation of application No. 13/615,351, filed on Sep. 13, 2012, now Pat. No. 8,501,339, which is a (Continued)

(51) Int. Cl.
*H01M 10/052* (2010.01)
*H01M 2/16* (2006.01)
(Continued)

(52) U.S. Cl.
CPC ............ *H01M 2/1673* (2013.01); *H01G 11/06* (2013.01); *H01G 11/52* (2013.01);
(Continued)

(58) Field of Classification Search
CPC ............ H01M 4/628; H01M 10/0565; H01M 10/0569
USPC .................... 429/126, 328, 339, 345
See application file for complete search history.

(56) References Cited

U.S. PATENT DOCUMENTS 3,528,856 A    9/1970  Ovshinsky
3,607,417 A    9/1971  McRae et al.
(Continued)

FOREIGN PATENT DOCUMENTS

EP    0111213    11/1983
EP    0111214    11/1983
(Continued)

OTHER PUBLICATIONS

International Search Report and Written Opinion dated Oct. 18, 2005 from International Application No. PCT/US2004/033372.
(Continued)

*Primary Examiner* — Tracy Dove
(74) *Attorney, Agent, or Firm* — Weaver Austin Villeneuve & Sampson LLP

(57) ABSTRACT

Active metal and active metal intercalation electrode structures and battery cells having ionically conductive protective architecture including an active metal (e.g., lithium) conductive impervious layer separated from the electrode (anode) by a porous separator impregnated with a non-aqueous electrolyte (anolyte). This protective architecture prevents the active metal from deleterious reaction with the environment on the other (cathode) side of the impervious layer, which may include aqueous or non-aqueous liquid electrolytes (catholytes) and/or a variety of electrochemically active materials, including liquid, solid and gaseous oxidizers. Safety additives and designs that facilitate manufacture are also provided.

20 Claims, 6 Drawing Sheets

Related U.S. Application Data continuation of application No. 12/888,154, filed on Sep. 22, 2010, now Pat. No. 8,293,398, which is a continuation of application No. 11/824,597, filed on Jun. 28, 2007, now Pat. No. 7,829,212, which is a division of application No. 11/824,944, filed on Apr. 14, 2004, now Pat. No. 7,282,295.

(60) Provisional application No. 60/542,532, filed on Feb. 6, 2004, provisional application No. 60/548,231, filed on Feb. 27, 2004.

(51) Int. Cl.
H01M 4/13 (2010.01)
H01M 10/0562 (2010.01)
H01M 10/0565 (2010.01)
H01G 11/06 (2013.01)
H01G 11/52 (2013.01)
H01G 11/58 (2013.01)
H01M 4/36 (2006.01)
H01M 4/587 (2010.01)
H01M 10/0525 (2010.01)

(52) U.S. Cl.
CPC ............ *H01G 11/58* (2013.01); *H01M 2/1686* (2013.01); *H01M 4/13* (2013.01); *H01M 4/366* (2013.01); *H01M 10/052* (2013.01); *H01M 10/0562* (2013.01); *H01M 10/0565* (2013.01); *H01M 4/587* (2013.01); *H01M 10/0525* (2013.01); *H01M 2300/0002* (2013.01); *H01M 2300/0085* (2013.01); *Y02E 60/122* (2013.01); *Y02E 60/13* (2013.01); *Y10T 29/49108* (2015.01)

(56) References Cited

U.S. PATENT DOCUMENTS

| | | |
|---|---|---|
| 3,615,835 A | 10/1971 | Ovshinsky |
| 3,625,769 A | 12/1971 | Lyall |
| 3,679,540 A | 7/1972 | Zimmerman et al. |
| 3,703,415 A | 11/1972 | Mitoff et al. |
| 3,912,536 A | 10/1975 | Galli et al. |
| 3,953,566 A | 4/1976 | Gore |
| 3,976,509 A | 8/1976 | Tsai et al. |
| 4,007,057 A | 2/1977 | Littauer et al. |
| 4,091,182 A | 5/1978 | Farrington et al. |
| 4,100,238 A | 7/1978 | Shinomura |
| 4,162,202 A | 7/1979 | Dey |
| 4,163,084 A | 7/1979 | Tsai et al. |
| 4,187,390 A | 2/1980 | Gore |
| 4,210,707 A | 7/1980 | Farrington |
| 4,385,101 A | 5/1983 | Catanzarite |
| 4,402,995 A | 9/1983 | Fleischer |
| 4,405,416 A | 9/1983 | Raistrick et al. |
| 4,414,293 A | 11/1983 | Joy et al. |
| 4,429,000 A | 1/1984 | Naka et al. |
| 4,504,561 A | 3/1985 | Winsel |
| 4,539,256 A | 9/1985 | Shipman |
| 4,726,989 A | 2/1988 | Mrozinski |
| 4,828,942 A | 5/1989 | Licht |
| 4,833,048 A | 5/1989 | De Jonghe et al. |
| 4,916,036 A | 4/1990 | Cheiky |
| 4,917,974 A | 4/1990 | Visco et al. |
| 4,981,672 A | 1/1991 | De Neufville et al. |
| 4,985,317 A | 1/1991 | Adachi et al. |
| 5,002,843 A | 3/1991 | Cieslak et al. |
| 5,035,963 A | 7/1991 | Plichta |
| 5,100,523 A | 3/1992 | Helms et al. |
| 5,108,856 A | 4/1992 | Shuster |
| 5,162,172 A | 11/1992 | Kaun |
| 5,162,175 A | 11/1992 | DeJonghe et al. |
| 5,166,011 A | 11/1992 | Rao et al. |
| 5,198,081 A | 3/1993 | Kanoh et al. |
| 5,213,908 A | 5/1993 | Hagedorn |
| 5,290,592 A | 3/1994 | Izuchi et al. |
| 5,314,765 A | 5/1994 | Bates |
| 5,336,384 A | 8/1994 | Tsou et al. |
| 5,338,625 A | 8/1994 | Bates et al. |
| 5,342,710 A | 8/1994 | Koksbang |
| 5,387,479 A | 2/1995 | Koksbang |
| 5,409,786 A | 4/1995 | Bailey |
| 5,413,881 A | 5/1995 | Licht et al. |
| 5,427,873 A | 6/1995 | Shuster |
| 5,455,126 A | 10/1995 | Bates et al. |
| 5,506,068 A | 4/1996 | Dan et al. |
| 5,510,209 A | 4/1996 | Abraham et al. |
| 5,512,147 A | 4/1996 | Bates et al. |
| 5,516,598 A | 5/1996 | Chu et al. |
| 5,523,179 A | 6/1996 | Chu |
| 5,525,442 A | 6/1996 | Shuster |
| 5,532,077 A | 7/1996 | Chu |
| 5,567,210 A | 10/1996 | Bates et al. |
| 5,569,520 A | 10/1996 | Bates |
| 5,571,600 A | 11/1996 | Licht |
| 5,582,623 A | 12/1996 | Chu |
| 5,597,660 A | 1/1997 | Bates et al. |
| 5,612,152 A | 3/1997 | Bates |
| 5,648,183 A | 7/1997 | Licht et al. |
| 5,648,187 A | 7/1997 | Skotheim |
| 5,652,068 A | 7/1997 | Shuster et al. |
| 5,665,481 A | 9/1997 | Shuster et al. |
| 5,686,201 A | 11/1997 | Chu |
| 5,693,212 A | 12/1997 | Mazanec et al. |
| 5,696,201 A | 12/1997 | Cavalloni et al. |
| 5,702,995 A | 12/1997 | Fu |
| 5,789,108 A | 8/1998 | Chu |
| 5,814,420 A | 9/1998 | Chu |
| 5,882,812 A | 3/1999 | De Jonghe et al. |
| 5,961,672 A | 10/1999 | Skotheim et al. |
| 5,962,171 A | 10/1999 | Boguslavsky et al. |
| 6,017,651 A | 1/2000 | Chu et al. |
| 6,025,094 A | 2/2000 | Visco et al. |
| 6,025,095 A | 2/2000 | Kawamura |
| 6,030,720 A | 2/2000 | Chu et al. |
| 6,030,909 A | 2/2000 | Fu |
| 6,066,417 A | 5/2000 | Cho et al. |
| 6,068,950 A | 5/2000 | Gan et al. |
| 6,096,447 A | 8/2000 | Gan et al. |
| 6,110,236 A | 8/2000 | Chu et al. |
| 6,146,787 A | 11/2000 | Harrup et al. |
| 6,165,644 A | 12/2000 | Chu et al. |
| 6,183,901 B1 | 2/2001 | Ying et al. |
| 6,198,701 B1 | 3/2001 | De Jonghe et al. |
| 6,200,701 B1 | 3/2001 | Gan et al. |
| 6,200,704 B1 | 3/2001 | De Jonghe et al. |
| 6,203,942 B1 | 3/2001 | Gan et al. |
| 6,203,947 B1 | 3/2001 | Peled et al. |
| 6,207,324 B1 | 3/2001 | Licht |
| 6,210,832 B1 | 4/2001 | Chu et al. |
| 6,214,061 B1 | 4/2001 | Visco et al. |
| 6,225,002 B1 | 5/2001 | Chu et al. |
| 6,228,527 B1 | 5/2001 | Medeiros et al. |
| 6,242,135 B1 | 6/2001 | Mushiake |
| 6,248,481 B1 | 6/2001 | Visco et al. |
| 6,274,269 B1 | 8/2001 | Gan et al. |
| 6,280,598 B1 | 8/2001 | Barton et al. |
| 6,296,958 B1 | 10/2001 | Pinto et al. |
| 6,315,881 B1 | 11/2001 | Fu |
| 6,358,643 B1 | 3/2002 | Katz et al. |
| 6,358,651 B1 | 3/2002 | Chen et al. |
| 6,376,123 B1 | 4/2002 | Chu |
| 6,391,492 B1 | 5/2002 | Kawakami et al. |
| 6,402,795 B1 | 6/2002 | Chu et al. |
| 6,413,284 B1 | 7/2002 | Chu et al. |
| 6,413,285 B1 | 7/2002 | DeJonghe et al. |
| 6,432,584 B1 | 8/2002 | Visco et al. |
| 6,475,677 B1 | 11/2002 | Inda et al. |
| 6,485,622 B1 | 11/2002 | Fu |
| 6,489,055 B1 | 12/2002 | Ichihashi et al. |
| 6,495,285 B2 | 12/2002 | Gan et al. |
| 6,511,772 B2 | 1/2003 | Gan et al. |

(56) References Cited

U.S. PATENT DOCUMENTS

| | | |
|---|---|---|
| 6,537,698 B2 | 3/2003 | Gan et al. |
| 6,537,701 B1 | 3/2003 | Chu et al. |
| 6,632,573 B1 | 10/2003 | Nimon et al. |
| 6,723,140 B2 | 4/2004 | Chu et al. |
| 6,733,924 B1 | 5/2004 | Skotheim et al. |
| 6,737,197 B2 | 5/2004 | Chu et al. |
| 6,766,817 B2 | 7/2004 | Da Silva |
| 6,770,187 B1 | 8/2004 | Putter et al. |
| 6,797,428 B1 | 9/2004 | Skotheim et al. |
| 6,835,492 B2 | 12/2004 | Cho et al. |
| 6,911,280 B1 | 6/2005 | De Jonghe et al. |
| 6,955,866 B2 | 10/2005 | Nimon et al. |
| 6,991,662 B2 | 1/2006 | Visco et al. |
| 7,070,632 B1 | 7/2006 | Visco et al. |
| 7,211,351 B2 | 5/2007 | Klaassen |
| 7,211,532 B2 | 5/2007 | Fu |
| 7,247,408 B2 | 7/2007 | Skotheim |
| 7,282,295 B2 | 10/2007 | Visco et al. |
| 7,282,296 B2 | 10/2007 | Visco et al. |
| 7,282,302 B2 | 10/2007 | Visco et al. |
| 7,344,804 B2 | 3/2008 | Klaassen |
| 7,390,591 B2 | 6/2008 | Visco et al. |
| 7,432,017 B2 | 10/2008 | Visco et al. |
| 7,491,458 B2 | 2/2009 | Visco et al. |
| 7,608,178 B2 | 10/2009 | De Jonghe et al. |
| 7,645,543 B2 | 1/2010 | Visco et al. |
| 7,666,233 B2 | 2/2010 | Visco et al. |
| 7,771,870 B2 | 8/2010 | Affinito et al. |
| 7,781,108 B2 | 8/2010 | Visco et al. |
| 7,829,212 B2 | 11/2010 | Visco et al. |
| 7,838,144 B2 | 11/2010 | Visco et al. |
| 7,858,223 B2 | 12/2010 | Visco et al. |
| 7,998,626 B2 | 8/2011 | Visco et al. |
| 8,048,571 B2 | 11/2011 | Visco et al. |
| 8,114,171 B2 | 2/2012 | Visco et al. |
| 8,182,943 B2 | 5/2012 | Visco et al. |
| 8,202,649 B2 | 6/2012 | Visco et al. |
| 8,323,820 B2 | 12/2012 | Visco et al. |
| 8,334,075 B2 | 12/2012 | Visco et al. |
| 8,389,147 B2 | 3/2013 | Visco et al. |
| 8,501,351 B2 | 8/2013 | Phillips et al. |
| 8,652,686 B2 | 2/2014 | Visco et al. |
| 8,652,692 B2 | 2/2014 | Visco et al. |
| 8,709,679 B2 | 4/2014 | Visco et al. |
| 8,828,580 B2 | 9/2014 | Visco et al. |
| 2001/0014420 A1 | 8/2001 | Takeuchi et al. |
| 2001/0028977 A1 | 10/2001 | Kazacos et al. |
| 2001/0041294 A1 | 11/2001 | Chu et al. |
| 2002/0012845 A1 | 1/2002 | Choi et al. |
| 2002/0012846 A1 | 1/2002 | Skotheim et al. |
| 2002/0015869 A1 | 2/2002 | Suda |
| 2002/0028389 A1 | 3/2002 | Sonoda et al. |
| 2002/0034688 A1 | 3/2002 | Chu et al. |
| 2002/0068220 A1 | 6/2002 | Wyler |
| 2002/0102465 A1 | 8/2002 | Chen et al. |
| 2002/0106563 A1 | 8/2002 | Okawa |
| 2003/0124433 A1 | 7/2003 | Kim et al. |
| 2003/0190501 A1 | 10/2003 | Rendina |
| 2003/0224234 A1 | 12/2003 | Steele et al. |
| 2004/0081894 A1 | 4/2004 | Nimon |
| 2004/0101761 A1 | 5/2004 | Park et al. |
| 2004/0126653 A1 | 7/2004 | Visco et al. |
| 2004/0142244 A1 | 7/2004 | Visco et al. |
| 2004/0185334 A1 | 9/2004 | Iwamoto |
| 2004/0191617 A1 | 9/2004 | Visco et al. |
| 2004/0197641 A1 | 10/2004 | Visco et al. |
| 2005/0095506 A1 | 5/2005 | Klaassen |
| 2005/0100792 A1 | 5/2005 | Visco et al. |
| 2005/0100793 A1 | 5/2005 | De Jonghe et al. |
| 2005/0175894 A1 | 8/2005 | Visco et al. |
| 2005/0186469 A1 | 8/2005 | De Jonghe et al. |
| 2005/0208353 A1 | 9/2005 | Johnson |
| 2006/0046149 A1 | 3/2006 | Yong et al. |
| 2006/0063051 A1 | 3/2006 | Jang |
| 2006/0078790 A1 | 4/2006 | Nimon et al. |
| 2006/0183011 A1 | 8/2006 | Mittelsteadt et al. |
| 2007/0051620 A1 | 3/2007 | Visco et al. |
| 2007/0087269 A1 | 4/2007 | Inda |
| 2007/0117007 A1 | 5/2007 | Visco et al. |
| 2007/0117026 A1 | 5/2007 | Kumar et al. |
| 2007/0148533 A1 | 6/2007 | Anglin et al. |
| 2007/0172739 A1 | 7/2007 | Visco et al. |
| 2007/0231704 A1 | 10/2007 | Inda |
| 2007/0259234 A1 | 11/2007 | Chua et al. |
| 2008/0038641 A1 | 2/2008 | Visco et al. |
| 2008/0052898 A1 | 3/2008 | Visco et al. |
| 2008/0057386 A1 | 3/2008 | Visco et al. |
| 2008/0057387 A1 | 3/2008 | Visco et al. |
| 2008/0057399 A1 | 3/2008 | Visco et al. |
| 2009/0239152 A1 | 9/2009 | Katoh |
| 2009/0286114 A1 | 11/2009 | Visco et al. |
| 2009/0297935 A1 | 12/2009 | Visco et al. |
| 2010/0104934 A1 | 4/2010 | Visco et al. |
| 2010/0203383 A1 | 8/2010 | Weppner |
| 2010/0273067 A1 | 10/2010 | Visco et al. |
| 2011/0014522 A1 | 1/2011 | Visco et al. |
| 2011/0039144 A1 | 2/2011 | Visco et al. |
| 2011/0053002 A1 | 3/2011 | Yamamura et al. |
| 2011/0244337 A1 | 10/2011 | Ohta et al. |
| 2011/0269007 A1 | 11/2011 | Visco et al. |
| 2011/0269031 A1 | 11/2011 | Visco et al. |
| 2011/0318648 A1 | 12/2011 | Eitouni et al. |
| 2012/0009469 A1 | 1/2012 | Visco et al. |
| 2012/0094188 A1 | 4/2012 | Visco et al. |
| 2012/0169016 A1 | 7/2012 | Hisano et al. |
| 2012/0219842 A1 | 8/2012 | Visco et al. |
| 2012/0270112 A1 | 10/2012 | Visco et al. |
| 2013/0066025 A1 | 3/2013 | Yang et al. |
| 2013/0273419 A1 | 10/2013 | Pistorino et al. |
| 2014/0004447 A1 | 1/2014 | Visco et al. |
| 2014/0057153 A1 | 2/2014 | Visco et al. |
| 2014/0170465 A1 | 6/2014 | Visco et al. |
| 2014/0335392 A1 | 11/2014 | Visco et al. |

FOREIGN PATENT DOCUMENTS

| | | |
|---|---|---|
| EP | 0694501 | 1/1996 |
| EP | 0838441 | 4/1998 |
| EP | 0875951 | 11/1998 |
| EP | 0689260 | 4/1999 |
| EP | 1162675 | 12/2001 |
| EP | 1699104 | 9/2006 |
| EP | 1892780 | 2/2008 |
| JP | 55-081471 | 6/1980 |
| JP | 57-003371 | 1/1982 |
| JP | 57-017568 | 1/1982 |
| JP | 57-103271 | 6/1982 |
| JP | 57-172660 | 10/1982 |
| JP | 62-243247 | 10/1987 |
| JP | 63-198261 | 8/1988 |
| JP | 04-275387 | 9/1992 |
| JP | 05-234578 | 9/1993 |
| JP | 09-320645 | 12/1997 |
| JP | 2001-351615 | 12/2001 |
| JP | 2002-513991 | 5/2002 |
| JP | 2002-518796 | 6/2002 |
| JP | 2002-528866 | 9/2002 |
| JP | 2002-289266 | 10/2002 |
| JP | 2003-217662 | 7/2003 |
| JP | 2003-346862 | 12/2003 |
| JP | 2004-504933 | 2/2004 |
| JP | 2005-503920 | 2/2005 |
| KR | 10/2001-0024927 | 3/2001 |
| KR | 2001-0043145 | 5/2001 |
| KR | 10-2002-0059419 | 7/2002 |
| WO | 98/28811 | 7/1998 |
| WO | 99/43034 | 8/1999 |
| WO | 99/57770 | 11/1999 |
| WO | 99/65101 | 12/1999 |
| WO | 00/51198 | 8/2000 |
| WO | 01/33651 | 5/2001 |
| WO | 01/39302 | 5/2001 |
| WO | 02/50933 | 6/2002 |
| WO | 02/095849 | 11/2002 |

(56) References Cited

FOREIGN PATENT DOCUMENTS

| WO | 2004/036669 | 4/2004 |
|---|---|---|
| WO | 2005/038953 | 4/2005 |
| WO | 2005/038962 | 4/2005 |

OTHER PUBLICATIONS

U.S. Appl. No. 11/092,781, Office Action mailed Jun. 16, 2006.
U.S. Appl. No. 11/092,781, Office Action mailed Feb. 1, 2007.
U.S. Appl. No. 11/092,781, Office Action mailed Jun. 25, 2007.
U.S. Appl. No. 11/092,781, Office Action mailed Feb. 22, 2008.
U.S. Appl. No. 10/686,189, Office Action mailed Oct. 12, 2006.
U.S. Appl. No. 10/686,189, Office Action mailed Apr. 11, 2007.
U.S. Appl. No. 10/731,771, Office Action mailed Sep. 28, 2006.
U.S. Appl. No. 10/731,771, Office Action mailed Mar. 16, 2007.
U.S. Appl. No. 10/772,157, Office Action mailed Nov. 1, 2007.
U.S. Appl. No. 10/772,157, Office Action mailed Feb. 6, 2008.
U.S. Appl. No. 10/772,157, Office Action mailed Jul. 11, 2008.
U.S. Appl. No. 10/772,157, Office Action mailed Dec. 30, 2008.
U.S. Appl. No. 11/824,548, Office Action mailed Mar. 20, 2008.
U.S. Appl. No. 11/824,548, Office Action mailed Jan. 26, 2009.
U.S. Appl. No. 10/825,587, Office Action mailed Jun. 25, 2007.
U.S. Appl. No. 10/825,587, Office Action mailed Apr. 1, 2008.
U.S. Appl. No. 10/825,587, Office Action mailed Jun. 5, 2008.
U.S. Appl. No. 10/825,587, Office Action mailed Oct. 16, 2008.
U.S. Appl. No. 10/772,228, Office Action mailed Sep. 21, 2007.
U.S. Appl. No. 10/772,228, Office Action mailed Nov. 28, 2006.
U.S. Appl. No. 10/824,944, Office Action mailed Mar. 12, 2007.
U.S. Appl. No. 10/824,944, Office Action mailed Sep. 7, 2006.
U.S. Appl. No. 11/245,472, Office Action mailed Aug. 23, 2007.
U.S. Appl. No. 11/245,472, Office Action mailed Apr. 16, 2008.
U.S. Appl. No. 10/986,441, Office Action mailed Oct. 20, 2008.
U.S. Appl. No. 11/823,847, Office Action mailed Sep. 16, 2008.
U.S. Appl. No. 12/649,245, Office Action mailed Mar. 31, 2010.
U.S. Appl. No. 10/825,587, Notice of Allowance mailed Nov. 24, 2008.
U.S. Appl. No. 10/772,228, Notice of Allowance mailed Jan. 22, 2008.
U.S. Appl. No. 11/824,574, Office Action mailed Dec. 31, 2008.
China patent application No. 2003801061464, First Office Action mailed Oct. 27, 2006.
Nippon Telegr & Teleph Corp., "Patent Abstracts of Japan," vol. 008, No. 119 (E-248), Jun. 5, 1984 & JP 59 031573 A, Feb. 20, 1984.
Anders et al., "Plasma is Produced Simply", R&D Research & Development, R&D Magazine, vol. 39, No. 10, Sep. 1997, www.rdmag.com, p. 65.
Steven D. Jones, et al., "Thin film rechargeable Li batteries", 1994, *Solid State Ionics*.
J.B. Bates, et al., "Thin-film rechargeable lithium Sources batteries," 1995, *Journal of Power Sources*.
N. J. Dudney, et al., "Sputtering of lithium compounds for preparation of electrolyte thin films," 1992, *Solid State Ionics*.
J. B. Bates, et al., "Electrical properties of amorphous lithium electrolye thin films," 1992, *Solid State Ionics*.
Xiaohua Yu, et al, "A Stable Thin-Film Lithium Electrolyte: Lithium Phosphorus Oxynitride," Feb. 1997, *J. Electrochem. Soc.*, vol. 144, No. 2.
Fu, Jie, "Fast Li+ Ion Conduction in Li2O-Al2O3—TiO2—SiO2—P2O5 Glass-Ceramics", Journal of the American Ceramics Society, vol. 80, No. 7, Jul. 1997, pp. 1-5.
Aono et al., "Ionic Conductivity of the Lithium Titanium Phosphate $(Li_{1+x}M_xTi_{2-x}X(PO_4)_3$, M = Al, Sc, Y, and La) Systems", Dept. of Industrial Chemistry, pp. 590-591, Aug. 19, 1988.
Aono, Hiromichi, "High Li+ Conducting Ceramics", Acc. Chem. Res. vol. 27, No. 9, 1994, pp. 265-270.
Aono, et al., "Ionic Conductivity and Sinterability of Lithium Titanium Phosphate System", Solid State Ionics, 40/41 (1990), pp. 38-42.
Aono, et al., "Electrical properties and crystal structure of solid electrolyte based on lithium hafniumphosphate $LiHf_2(PO_4)_3$", Solid State Ionics 62 (1993), pp. 309-316.
Aono, et al., "Electrical property and sinterability of $LiTi_2(PO_4)_3$ mixed with lithium salt ($Li_3PO_4$ or $Li_3BO_3$)", Solid State Ionics 47 (1991) pp. 257-264.
Aono, et al., "Ionic Conductivity of $\beta=Fe_2(SO_4)_3$ Type $Li_3Cr_2(PO_4)_3$ Based Electrolyte", Chemistry Letters, 1993, pp. 2033-2036.
Aono, et al., "Ionic Conductivity of $LiTi_2(PO_4)_3$ Mixed with Lithium Salts", Chemistry Letters, 1990, pp. 331-334.
Fu, Jie, "Superionic conductivity of glass-ceramics in the system $Li_2O-Al_2O_3-TiO_3-P_2O_5$", Solid State Ionics, 96 (1997), pp. 195-200.
Fu, Jie, "Fast Li+ ion conducting glass-ceramics in the system $Li_2O-Al_2O_3-GeO_2-P_2O_5$" Solid State Ionics 104 (1997), pp. 191-194.
Aono, et al., "DC Conductivity of $Li_{1.3}Al_{0.3}Ti_{1.7}(PO_4)_3$ Ceramic with Li Electrodes", Chemistry Letters, 1991, pp. 1567-1570.
Aono, et al., "Electrical Properties of Sintered Lithium Titanium Phosphate Ceramics $(Li_{1+x}M_xTi_{2-x}PO_4)_3, M^{3+}=Al^{3+}, Sc^{3+}, or Y^{3+})$", Chemistry Letters, 1990, pp. 1825-1828.
Button, et al., "Structural disorder and enhanced ion transport in amorphous conductors", Solid State Ionics, vols. 9-10, Part 1, Dec. 1983, pp. 585-592 (abstract).
Shuster, Nicholas, "LithiumWater Power Source for Low Power-Long Duration Undersea Applications", Westinghouse Electric Corporation, 1990 IEEE, pp. 118-123.
VanVoorhis, et al., "Evaluation of Air Cathodes for Lithium/Air Batteries", Electrochemical Society Proceedings vol. 98-16, 1999, pp. 383-390.
Blurton et al., "Metal/Air Batteries: Their Status and Potential—A Review", Journal of Power Sources, 4, (1979), pp. 263-279.
J. Read, "Characterization of the Lithium/Oxygen Organic Electrolyte Battery", Journal of the Electrochemical Society, 149 (9) (2002), pp. A1190-A1195.
Abraham et al., "A Polymer Electrolyte-Based Rechargeable Lithium/Oxygen Battery", Technical Papers, Electrochemical Science and Technology, J. Electrochem. Soc., vol. 143, No. 1, Jan. 1996, pp. 1-5.
Kessler, et al., "Large Microsheet Glass for 40-in. Class PALC Displays", 1997, FMC2-3, pp. 61-63.
Feng et al., "Electrochemical behavior of intermetallic-based metal hydrides used in Ni/metal hydride (MH) batteries: a review", International Journal of Hydrogen Energy, 26 (2001), pp. 725-734.
Iwakura et al., "All solid-state nickel/metal hydride battery with a proton-conductive phosphoric acid-doped silica gel electrolyte", Electrochimica Acta 48 (2003), pp. 1499-1503.
Li et al., "Lithium-Ion Cells with Aqueous Electrolytes", J. Electrochem. Soc., vol. 142, No. 6, Jun. 1995, pp. 1742-1746.
Zhang et al., "Electrochemical Lithium Intercalation in $VO_2(B)$ in Aqueous Electrolytes", J. Electrochem. Soc., vol. 143, No. 9, Sep. 1996, pp. 2730-2735.
Urquidi-Mcdonald, Mirna, "Hydrogen storage and semi-fuel cells", http://engr.psu.edu/h2e/Pub/Macdonald1.htm, (downloaded Jan. 27, 2004, 3 pages).
Urquidi-Mcdonald, et al., "Lithium/poly(organophosphazene) membrane anodes in KOH and seawater", Electrochimica Acta 47, (2002), pp. 2495-2503.
Nimon et al., "Stability of Lithium Electrode in Contact with Glass Electrolytes", SSI-14, Jun. 22-27, 2003, Monterey, CA. (conference poster).
Nimon et al., "Stability of Lithium Electrode in Contact with Glass Electrolytes", SSI-14 Conference, Monterey, CA, Jun. 22, 2003, Abstract of Poster.
Inaguma et al., "High Ionic Conductivity in Lithium Lanthanum Titanate", Solid State Communications, vol. 86, No. 10, pp. 689-693, 1993.
Kobayashi et al., "All-solid-state lithium secondary battery with ceramic-polymer composite electrolyte", Solid State Ionics 152-153 (2002) 137-142.
Will et al., "Primary Sodium Batteries with Beta-Alumina Solid Electrolyte", J. Electrochemical Science and Technology, Apr. 1975, vol. 122, No. 4, pp. 457-461.
EP patent application No. 03809186.4, Examination Report dated Mar. 21, 2006.
International patent application No. PCT/US2004/033371, International Search Report dated Mar. 6, 2006.

(56) References Cited

OTHER PUBLICATIONS

International patent application No. PCT/US2004/033424, International Search Report dated Jan. 6, 2006.
Galbraith, A.D., "The lithium-water-air battery for automotive propulsion", XP002355800, retrieved from STN Database accession No. 1979:106901 abstract and Symp. Int. Veh. Electr., Rapp, 4$^{th}$ vol. 1, paper 32.4, 23 pp., Publisher: Electr. Veh. Counc., New York, N.Y. Conden: 39UPAD, 1976.
International patent application No. PCT/US2004/033361, International Search Report and Written Opinion dated Jan. 16, 2006.
International patent application No. PCT/US2004/033424, International Search Report and Written Opinion dated Mar. 6, 2006.
West, et al., "Chemical stability enhancement of lithium conducting solid electrolyte plates using sputtered LiPON thin films", Journal of Power Sources, vol. 126, Issues 1-2, pp. 1-272 (Feb. 16, 2004).
International patent application No. PCT/US2004/033424, Invitation to Pay Additional Fees dated Jan. 6, 2006.
EP patent application No. 04794699.1, Examination Report dated May 31, 2007.
WO patent application No. PCT/US06/45407, International Search Report and Written Opinion, mailed Aug. 30, 2007.
CN patent application No. 200480037293.5, Office Action mailed Aug. 22, 2008.
EP patent application No. 04794699.1, Examination Report mailed Aug. 5, 2008.
AU patent application No. 2003301383, Examination Report mailed Sep. 29, 2008.
CN patent application No. 200480042697.3, Office Action mailed Feb. 15, 2008.
U.S. Appl. No. 11/245,472, Office Action mailed Jul. 24, 2008.
CN patent application No. 200480042697.3, Office Action mailed Dec. 19, 2008.
Thokchom, Joykumar S., et al., Water Durable Lithium Ion Conducting Composite Membranes from the $Li_2O$—$Al_2O_3$—$TiO_2$—$P_2O_5$ Glass-Ceramic, *Jouranl of the Electrochemical Society*, 154 (4), 2007, pp. A331-A336.
U.S. Appl. No. 11/245,472, Office Action mailed Jan. 8, 2009.
U.S. Appl. No. 11/824,579, Office Action mailed Jan. 29, 2009.
U.S. Appl. No. 11/823,847, Office Action mailed Apr. 28, 2009.
CN patent application No. 200480042697.3, Office Action mailed Jun. 5, 2009.
U.S. Appl. No. 11/245,472, Office Action mailed Jul. 8, 2009.
AU patent application No. 2004306866, Exam Report mailed Apr. 9, 2009.
AU patent application No. 2004316638, Office Action mailed Aug. 3, 2009.
U.S. Appl. No. 10/986,441, Notice of Allowance mailed Jun. 19, 2009.
U.S. Appl. No. 10/772,157, Notice of Allowance mailed Sep. 17, 2009.
International patent application No. PCT/US06/48755, International Search Report mailed Apr. 7, 2008.
International patent application No. PCT/US06/48755, Written Opinion mailed Apr. 7, 2008.
Ogasawara T. et al., "Rechargeable $Li_2O_2$ Electrode for Lithium Batteries", J. Am. Chem. Soc. 128(4), 2006, pp. 1390-1393.
Foster D.L. et al., "Ceramic Membranes for Lithium Batteries", Proceeding of the 42$^{nd}$ Power Sources Conference, Jun. 2006, P2.14.
Read J., "Electrolyte Formulation and Temperature Performance of the $Li/O_2$ Battery", Proceeding of the 9$^{th}$ Electrochemical Power Sources R&D Symposium, Jun. 2005, 15 pages.
EP patent application No. 04794699.1, Notice of Allowance mailed Jun. 10, 2009.
U.S. Appl. No. 12/334,116, Office Action mailed Oct. 27, 2009.
EP patent application No. 03809186.4, Examination Report mailed Nov. 24, 2009.
U.S. Appl. No. 11/824,548, Notice of Allowance mailed Dec. 17, 2009.
U.S. Appl. No. 11/245,472, Office Action mailed Feb. 4, 2010.
U.S. Appl. No. 12/475,403, Office Action mailed Feb. 8, 2010.
AU patent application No. 2003301383, Notice of Acceptance mailed Nov. 26, 2009.
CN patent application No. 200480037293.5, Office Action mailed Jan. 29, 2010.
EP patent application No. 04794655.3, Examination Report mailed Apr. 22, 2010.
CA patent application No. 2,502,438, Examination Report mailed May 12, 2010.
U.S. Appl. No. 11/562,883, Office Action mailed Jun. 7, 2010.
AU patent application No. 2006280097, Examination Report mailed Jun. 9, 2010.
JP patent application No. 2004-545584, Notification of reason for rejection mailed Jun. 8, 2010.
U.S. Appl. No. 12/475,403, Office Action mailed Jun. 22, 2010.
U.S. Appl. No. 11/824,579, Office Action mailed Jun. 25, 2010.
CN patent application No. 200480037293.5, Office Action mailed Jun. 24, 2010.
AU patent application No. 2004306866, Notice of Acceptance mailed Jun. 17, 2010.
U.S. Appl. No. 12/649,245, Office Action mailed Jul. 19, 2010.
U.S. Appl. No. 12/831,066, Office Action mailed Aug. 18, 2010.
U.S. Appl. No. 11/824,597, Notice of Allowance mailed Sep. 9, 2010.
KR patent application No. 10-2005-7006382, Office Action mailed Aug. 31, 2010.
U.S. Appl. No. 12/475,403, Notice of Allowance mailed Oct. 7, 2010.
Thangadurai, Venkataraman et al., "Novel fast lithium ion conduction in garnet-type $Li_5La_3M_2O_{12}$ (M = Nb, Ta)", J. Am. Chem. Soc. 86 (3) 437-40 (2003), Oct. 21, 2002.
U.S. Appl. No. 12/649,245, Office Action mailed Nov. 30, 2010.
U.S. Appl. No. 11/612,741, Office Action mailed Nov. 29, 2010.
U.S. Appl. No. 11/562,883, Office Action mailed Jan. 19, 2011.
U.S. Appl. No. 12/831,066, Office Action mailed Jan. 19, 2011.
CA patent application No. 2,542,304, Examination Report mailed Apr. 4, 2011.
U.S. Appl. No. 12/831,066, Notice of Allowance mailed Apr. 6, 2011.
U.S. Appl. No. 12/907,819, Office Action mailed May 12, 2011.
Visco, S.J. et al., "Lithium-Air", Encyclopedia of Electrochemical Power Sources, Dyer (editor), Elsevier, 2009, ISBN: 9780444527455, pp. 376-383.
CA patent application No. 2,555,637, Exam Report mailed May 10, 2011.
KR patent application No. 10-2006-7017692, Notice to Submit Response mailed May 13, 2011.
JP patent application No. 2006-535572, Office Action mailed Jun. 21, 2011.
JP patent application No. 2006-552102, Office Action mailed Jul. 5, 2011.
U.S. Appl. No. 11/612,741, Office Action mailed Jul. 22, 2011.
U.S. Appl. No. 12/649,245, Notice of Allowance mailed Sep. 14, 2011.
KR patent application No. 2006-7007309, Office Action mailed Jul. 27, 2011.
KR patent application No. 2005-7006382, Office Action mailed Aug. 10, 2011.
U.S. Appl. No. 12/907,819, Notice of Allowance mailed Nov. 10, 2011.
U.S. Appl. No. 13/236,428, Office Action mailed Nov. 16, 2011.
CN patent application No. 200910174918.7, Office Action mailed Oct. 19, 2011.
U.S. Appl. No. 11/612,741, Notice of Allowance mailed Feb. 3, 2012.
CA patent application No. 2,542,304, Exam Report mailed Apr. 3, 2012.
KR patent application No. 9-5-2012-016417008, Office Action mailed Mar. 21, 2012.
U.S. Appl. No. 13/236,428, Notice of Allowance mailed Apr. 25, 2012.
U.S. Appl. No. 12/888,154, Office Action mailed May 3, 2012.
KR patent application No. 10-2005-7006382, Office Action mailed Mar. 31, 2012.
U.S. Appl. No. 13/336,459, Office Action mailed Jun. 7, 2012.
U.S. Appl. No. 13/182,322, Office Action mailed Jul. 5, 2012.
EP patent application No. 03809186.4, Exam Report mailed Jun. 21, 2012.

(56) References Cited

OTHER PUBLICATIONS

U.S. Appl. No. 13/453,964, Notice of Allowance mailed Aug. 14, 2012.
U.S. Appl. No. 12/888,154, Notice of Allowance mailed Aug. 20, 2012.
U.S. Appl. No. 13/464,835, Office Action mailed Sep. 25, 2012.
U.S. Appl. No. 13/182,322, Notice of Allowance mailed Sep. 19, 2012.
JP patent application No. 2006-552102, Office Action mailed Sep. 25, 2012.
KR patent application No. 10-2005-7006382, Notice to Submit Response mailed Oct. 30, 2012.
KR patent application No. 9-5-2012-016417008, Notice of Allowance mailed Nov. 23, 2012.
Licht et al., "A solid sulfur cathode for aqueous batteries," *Science*, vol. 261, No. 5124 (Aug. 20, 1993) 1029-1032.
Licht et al., "Investigation of a novel aqueous aluminum/sulfur battery," *Journal of Power Sources*, 45 (1993) 311-323.
U.S. Appl. No. 13/673,789, Office Action mailed Feb. 28, 2013.
U.S. Appl. No. 13/615,351, Office Action mailed Mar. 25, 2013.
CA patent application No. 2,542,304, Office Action mailed Jan. 30, 2013.
U.S. Appl. No. 13/464,835, Office Action mailed May 2, 2013.
U.S. Appl. No. 13/615,351, Notice of Allowance mailed May 31, 2013.
U.S. Appl. No. 11/562,883, Office Action mailed Jun. 10, 2013.
U.S. Appl. No. 13/708,540, Office Action mailed Jun. 17, 2013.
U.S. Appl. No. 13/464,835, Office Action mailed Aug. 29, 2013.
Choi et al., "Challenges facing lithium batteries and electrical double-layer capacitors," www.angewandte.org Angew. Chem. Int. Ed. 2012, 51, 9994-10024 (31 pages).
Freunberger et al., "Reactions in the rechargeable lithium—$O_2$ battery with alkyl carbonate electrolytes," ACS Publications, J. Am. Chem. Soc. 2011, 133, 8040-8047 (8 pages).
Freunberger et al., "The lithium-oxygen battery with ether-based electrolytes," Wiley Online Library, Angew. Chem. Int. Ed. 2011, 50, 1-6 (6 pages).
CA patent application No. 2,542,304, Notice of Allowance mailed Aug. 18, 2013.
TW patent application No. 097122683, Office Action mailed Aug. 13, 2013.
U.S. Appl. No. 13/673,789, Notice of Allowance mailed Oct. 1, 2013.
U.S. Appl. No. 13/708,540, Office Action mailed Oct. 16, 2013.
U.S. Appl. No. 11/562,883, Notice of Allowance mailed Oct. 17, 2013.
JP patent application No. 2006-552102, Office Action mailed Nov. 26, 2013.
KR patent application No. 2013-078956319, Notice to Submit Response mailed Nov. 18, 2013.
U.S. Appl. No. 13/464,835, Office Action mailed Jan. 16, 2014.
Linden and T.B. Reddy, *Handbook of Batteries*, McGraw-Hill, NY $3^{rd}$ Edition, 2002, p. 38.5.
U.S. Appl. No. 13/717,255, Notice of Allowance mailed Jan. 30, 2014.
BR patent application No. P10415312.0, Search and Exam Report mailed Mar. 6, 2014.
U.S. Appl. No. 13/708,540, Office Action mailed Apr. 17, 2014.
U.S. Appl. No. 13/708,540, Notice of Allowance mailed May 23, 2014.
U.S. Appl. No. 14/292,699, "Protected lithium electrodes based on ceramic membranes," Visco et al., filed May 30, 2014.
U.S. Appl. No. 13/464,835, Office Action mailed Jun. 3, 2014.
U.S. Appl. No. 13/929,653, Notice of Allowance mailed Jun. 9, 2014.
KR patent application No. 10-2013-7020727, Office Action mailed May 22, 2014.
JP patent application No. 2006-552102, Office Action mailed Jul. 8, 2014.
WO patent application No. PCT/US2011/030969, International Search Report and Written Opinion mailed Jan. 11, 2012.
U.S. Appl. No. 12/973,779, Office Action mailed Dec. 19, 2012.
U.S. Appl. No. 12/973,779, Office Action mailed May 31, 2013.
U.S. Appl. No. 12/973,779, Office Action mailed Nov. 29, 2013.
U.S. Appl. No. 14/289,502, "Bi-polar protected electrodes and multi-cell stacks," Visco et al., filed May 28, 2014.
JP patent application No. 2006-552102, Decision to Grant mailed Aug. 25, 2014.
U.S. Appl. No. 13/464,835, Office Action mailed Jan. 9, 2015.
EP patent application No. 03809186.4, Exam Report mailed Mar. 24, 2015.
WO2009/003695, machine English translation, Jan. 8, 2009.
WO2013/010692, machine English translation, Jan. 24, 2013.
JP patent application No. 2014-108250, Notification of Reasons for Rejection mailed Jun. 16, 2015.

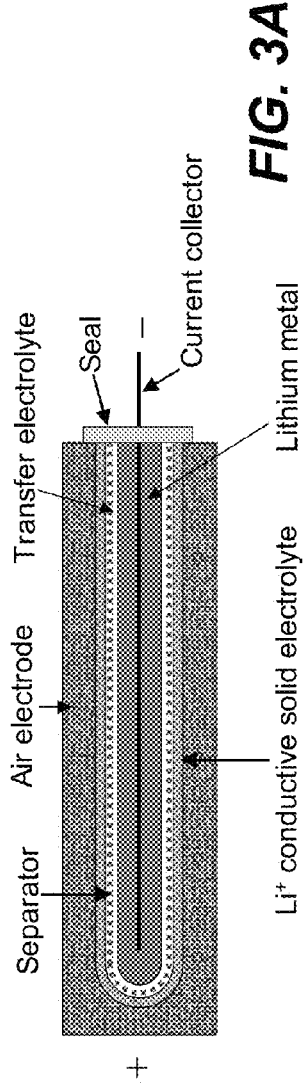
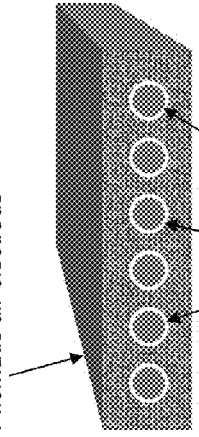
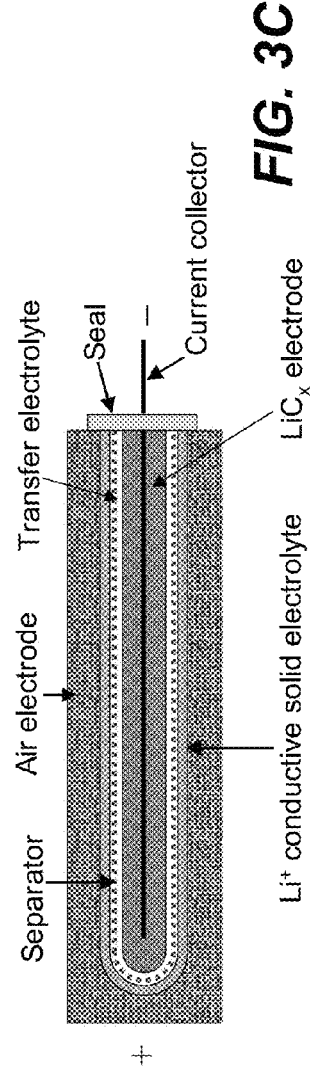
FIG. 3A
FIG. 3B
FIG. 3C

PROTECTED ACTIVE METAL ELECTRODE AND BATTERY CELL STRUCTURES WITH NON-AQUEOUS INTERLAYER ARCHITECTURE

CROSS-REFERENCE TO RELATED APPLICATIONS

This application is a continuation of U.S. patent application Ser. No. 13/929,653, filed Jun. 27, 2013, titled LITHIUM BATTERY HAVING A PROTECTED LITHIUM ELECTRODE AND AN IONIC LIQUID CATHOLYTE, now pending, which is a continuation of U.S. patent application Ser. No. 13/615,351, filed Sep. 13, 2012, titled PROTECTED LITHIUM ELECTRODES HAVING A POLYMER ELECTROLYTE INTERLAYER AND BATTERY CELLS THEREOF, now U.S. Pat. No. 8,501,339, which is a continuation of U.S. patent application Ser. No. 12/888,154, filed Sep. 22, 2010, titled PROTECTED ACTIVE METAL ELECTRODE AND BATTERY CELL WITH IONICALLY CONDUCTIVE PROTECTIVE ARCHITECTURE, now U.S. Pat. No. 8,293,398; which is a continuation of U.S. patent application Ser. No. 11/824,597, filed Jun. 28, 2007, titled PROTECTED ACTIVE METAL ELECTRODE AND BATTERY CELL STRUCTURES WITH NON-AQUEOUS INTERLAYER ARCHITECTURE, now U.S. Pat. No. 7,829,212; which is a divisional of U.S. patent application Ser. No. 10/824,944, filed Apr. 14, 2004, titled PROTECTED ACTIVE METAL ELECTRODE AND BATTERY CELL STRUCTURES WITH NON-AQUEOUS INTERLAYER ARCHITECTURE, now U.S. Pat. No. 7,282,295; which in turn claims priority to U.S. Provisional Patent Application No. 60/542,532 filed Feb. 6, 2004, titled PROTECTED ACTIVE METAL ELECTRODE AND BATTERY CELL STRUCTURES WITH NON-AQUEOUS INTERLAYER ARCHITECTURE; and U.S. Provisional Patent Application No. 60/548,231 filed Feb. 27, 2004, titled VARIATIONS ON PROTECTED ACTIVE METAL ELECTRODE AND BATTERY CELL STRUCTURES WITH NON-AQUEOUS INTERLAYER ARCHITECTURE; the disclosures of which are incorporated herein by reference in their entirety and for all purposes.

BACKGROUND OF THE INVENTION

1. Field of the Invention

The present invention relates generally to active metal electrochemical devices. More particularly, this invention relates to an active metal (e.g., alkali metals, such as lithium), active metal intercalation (e.g. lithium-carbon, carbon) and active metal alloys (e.g., lithium-tin) alloys or alloying metals (e.g., tin) electrochemical (e.g., electrode) structures and battery cells. The electrode structures have ionically conductive protective architecture including an active metal (e.g., lithium) conductive impervious layer separated from the electrode (anode) by a porous separator impregnated with a non-aqueous electrolyte. This protective architecture prevents the active metal from deleterious reaction with the environment on the other (cathode) side of the impervious layer, which may include aqueous, air or organic liquid electrolytes and/or electrochemically active materials.

2. Description of Related Art

The low equivalent weight of alkali metals, such as lithium, render them particularly attractive as a battery electrode component. Lithium provides greater energy per volume than the traditional battery standards, nickel and cadmium. Unfortunately, no rechargeable lithium metal batteries have yet succeeded in the market place.

The failure of rechargeable lithium metal batteries is largely due to cell cycling problems. On repeated charge and discharge cycles, lithium "dendrites" gradually grow out from the lithium metal electrode, through the electrolyte, and ultimately contact the positive electrode. This causes an internal short circuit in the battery, rendering the battery unusable after a relatively few cycles. While cycling, lithium electrodes may also grow "mossy" deposits that can dislodge from the negative electrode and thereby reduce the battery's capacity.

To address lithium's poor cycling behavior in liquid electrolyte systems, some researchers have proposed coating the electrolyte facing side of the lithium negative electrode with a "protective layer." Such protective layer must conduct lithium ions, but at the same time prevent contact between the lithium electrode surface and the bulk electrolyte. Many techniques for applying protective layers have not succeeded.

Some contemplated lithium metal protective layers are formed in situ by reaction between lithium metal and compounds in the cell's electrolyte that contact the lithium. Most of these in situ films are grown by a controlled chemical reaction after the battery is assembled. Generally, such films have a porous morphology allowing some electrolyte to penetrate to the bare lithium metal surface. Thus, they fail to adequately protect the lithium electrode.

Various pre-formed lithium protective layers have been contemplated. For example, U.S. Pat. No. 5,314,765 (issued to Bates on May 24, 1994) describes an ex situ technique for fabricating a lithium electrode containing a thin layer of sputtered lithium phosphorus oxynitride ("LiPON") or related material. LiPON is a glassy single ion conductor (conducts lithium ion) that has been studied as a potential electrolyte for solid state lithium microbatteries that are fabricated on silicon and used to power integrated circuits (See U.S. Pat. Nos. 5,597,660, 5,567,210, 5,338,625, and 5,512,147, all issued to Bates et al.).

Work in the present applicants' laboratories has developed technology for the use of glassy or amorphous protective layers, such as LiPON, in active metal battery electrodes. (See, for example, U.S. Pat. No. 6,025,094, issued Feb. 15, 2000, U.S. Pat. No. 6,402,795, issued Jun. 11, 2002, U.S. Pat. No. 6,214,061, issued Apr. 10, 2001 and U.S. Pat. No. 6,413,284, issued Jul. 2, 2002, all assigned to PolyPlus Battery Company).

Prior attempts to use lithium anodes in aqueous environments relied either on the use of very basic conditions such as use of concentrated aqueous KOH to slow down the corrosion of the Li electrode, or on the use of polymeric coatings on the Li electrode to impede the diffusion of water to the Li electrode surface. In all cases however, there was substantial reaction of the alkali metal electrode with water. In this regard, the prior art teaches that the use of aqueous cathodes or electrolytes with Li-metal anodes is not possible since the breakdown voltage for water is about 1.2 V and a Li/water cell can have a voltage of about 3.0 V. Direct contact between lithium metal and aqueous solutions results in violent parasitic chemical reaction and corrosion of the lithium electrode for no useful purpose. Thus, the focus of research in the lithium metal battery field has been squarely on the development of effective non-aqueous (mostly organic) electrolyte systems.

SUMMARY OF THE INVENTION

The present invention relates generally to active metal electrochemical devices. More particularly, this invention relates to an active metal (e.g., alkali metals, such as lithium), active metal intercalation (e.g. lithium-carbon, carbon) and active metal alloys (e.g., lithium-tin) alloys or alloying metals (e.g., tin) electrochemical (e.g., electrode) structures and battery cells. The electrochemical structures have ionically conductive protective architecture including an active metal (e.g., lithium) ion conductive substantially impervious layer separated from the electrode (anode) by a porous separator impregnated with a non-aqueous electrolyte (anolyte). This protective architecture prevents the active metal from deleterious reaction with the environment on the other (cathode) side of the impervious layer, which may include aqueous, air or organic liquid electrolytes (catholytes) and/or electrochemically active materials.

The separator layer of the protective architecture prevents deleterious reaction between the active metal (e.g., lithium) of the anode and the active metal ion conductive substantially impervious layer. Thus, the architecture effectively isolates (de-couples) the anode/anolyte from solvent, electrolyte processing and/or cathode environments, including such environments that are normally highly corrosive to Li or other active metals, and at the same time allows ion transport in and out of these potentially corrosive environments.

Various embodiments of the cells and cell structures of the present invention include active metal, active metal-ion, active metal alloying metal, and active metal intercalating anode materials protected with an ionically conductive protective architecture having a non-aqueous anolyte. These anodes may be combined in battery cells with a variety of possible cathode systems, including water, air, metal hydride and metal oxide cathodes and associated catholyte systems, in particular aqueous catholyte systems.

Safety additives may also be incorporated into the structures and cells of the present invention for the case where the substantially impervious layer of the protective architecture (e.g., a glass or glass-ceramic membrane) cracks or otherwise breaks down and allows the aggressive catholyte to enter and approach the lithium electrode. The non-aqueous interlayer architecture can incorporate a gelling/polymerizing agent that, when in contact with the reactive catholyte, leads to the formation of an impervious polymer on the lithium surface. For example, the anolyte may include a monomer for a polymer that is insoluble or minimally soluble in water, for example dioxolane (Diox)/polydioxaloane and the catholyte may include a polymerization initiator for the monomer, for example, a protonic acid.

In addition, the structures and cells of the present invention may take any suitable form. One advantageous form that facilitates fabrication is a tubular form.

In one aspect, the invention pertains to an electrochemical cell structure. The structure includes an anode composed of an active metal, active metal-ion, active metal alloy, active metal alloying metal or active metal intercalating material. The anode has an ionically conductive protective architecture on its surface. The architecture includes an active metal ion conducting separator layer that has a non-aqueous anolyte and is chemically compatible with the active metal and in contact with the anode, and a substantially impervious ionically conductive layer chemically compatible with the separator layer and aqueous environments and in contact with the separator layer. The separator layer may be, a semi-permeable membrane impregnated with an organic anolyte, for example, a micro-porous polymer impregnated with a liquid or gel phase anolyte. Such an electrochemical (electrode) structure may be paired with a cathode system, including an aqueous cathode system, to form battery cells in accordance with the present invention.

The structures and battery cells incorporating the structures of the present invention may have various configurations, including prismatic and cylindrical, and compositions, including active metal ion, alloy and intercalation anodes, aqueous, water, air, metal hydride and metal oxide cathodes, and aqueous, organic or ionic liquid catholytes; electrolyte (anolyte and/or catholyte) compositions to enhance the safety and/or performance of the cells; and fabrication techniques.

These and other features of the invention are further described and exemplified in the detailed description below.

BRIEF DESCRIPTION OF THE DRAWINGS

FIGS. 3A-C illustrate embodiments of battery cells in accordance with the present invention that use a tubular protected anode design.

DETAILED DESCRIPTION OF SPECIFIC EMBODIMENTS

Figure 1:
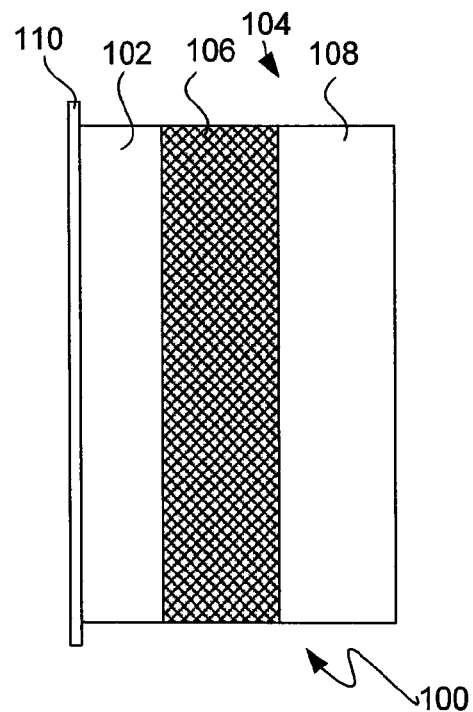
FIG. 1 is a schematic illustration of an electrochemical structure cell incorporating an ionically conductive protective interlayer architecture in accordance with the present invention.

Reference will now be made in detail to specific embodiments of the invention. Examples of the specific embodiments are illustrated in the accompanying drawings. While the invention will be described in conjunction with these specific embodiments, it will be understood that it is not intended to limit the invention to such specific embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

When used in combination with "comprising," "a method comprising," "a device comprising" or similar language in this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this invention belongs.

Introduction

Active metals are highly reactive in ambient conditions and can benefit from a barrier layer when used as electrodes. They are generally alkali metals such (e.g., lithium, sodium or potassium), alkaline earth metals (e.g., calcium or magnesium), and/or certain transitional metals (e.g., zinc), and/or alloys of two or more of these. The following active metals may be used: alkali metals (e.g., Li, Na, K), alkaline earth metals (e.g., Ca, Mg, Ba), or binary or ternary alkali metal alloys with Ca, Mg, Sn, Ag, Zn, Bi, Al, Cd, Ga, In. Preferred alloys include lithium aluminum alloys, lithium silicon alloys, lithium tin alloys, lithium silver alloys, and sodium lead alloys (e.g., $Na_4Pb$). A preferred active metal electrode is composed of lithium.

The low equivalent weight of alkali metals, such as lithium, render them particularly attractive as a battery electrode component. Lithium provides greater energy per volume than the traditional battery standards, nickel and cadmium. However, lithium metal or compounds incorporating lithium with a potential near that (e.g., within about a volt) of lithium metal, such as lithium alloy and lithium-ion (lithium intercalation) anode materials, are highly reactive to many potentially attractive electrolyte and cathode materials. This invention describes the use of a non-aqueous electrolyte interlayer architecture to isolate an active metal (e.g., alkali metal, such as lithium), active metal alloy or active metal-ion electrode (usually the anode of a battery cell) from ambient and/or the cathode side of the cell. The architecture includes an active metal ion conducting separator layer with a non-aqueous anolyte (i.e., electrolyte about the anode), the separator layer being chemically compatible with the active metal and in contact with the anode, and a substantially impervious ionically conductive layer chemically compatible with the separator layer and aqueous environments and in contact with the separator layer. The non-aqueous electrolyte interlayer architecture effectively isolates (de-couples) the anode from ambient and/or cathode, including catholyte (i.e., electrolyte about the cathode) environments, including such environments that are normally highly corrosive to Li or other active metals, and at the same time allows ion transport in and out of these potentially corrosive environments. In this way, a great degree of flexibility is permitted the other components of an electrochemical device, such as a battery cell, made with the architecture. Isolation of the anode from other components of a battery cell or other electrochemical cell in this way allows the use of virtually any solvent, electrolyte and/or cathode material in conjunction with the anode. Also, optimization of electrolytes or cathode-side solvent systems may be done without impacting anode stability or performance.

There are a variety of applications that could benefit from the use of aqueous solutions, including water and water-based electrolytes, air, and other materials reactive to lithium and other active metals, including organic solvents/electrolytes and ionic liquids, on the cathode side of the cell with an active (e.g., alkali, e.g., lithium) metal or active metal intercalation (e.g., lithium alloy or lithium-ion) anode in a battery cell.

The use of lithium intercalation electrode materials like lithium-carbon and lithium alloy anodes, rather than lithium metal, for the anode can also provide beneficial battery characteristics. First of all, it allows the achievement of prolonged cycle life of the battery without risk of formation of lithium metal dendrites that can grow from the Li surface to the membrane surface causing the membrane's deterioration. Also, the use of lithium-carbon and lithium alloy anodes in some embodiments of the present invention instead of lithium metal anode can significantly improve a battery's safety because it avoids formation of highly reactive "mossy" lithium during cycling.

The present invention describes a protected active metal, alloy or intercalation electrode that enables very high energy density lithium batteries such as those using aqueous electrolytes or other electrolytes that would otherwise adversely react with lithium metal, for example. Examples of such high energy battery couples are lithium-air, lithium-water lithium-metal hydride, lithium-metal oxide, and the lithium alloy and lithium-ion variants of these. The cells of the invention may incorporate additional components in their electrolytes (anolytes and catholytes) to enhance cell safety, and may have a variety of configurations, including planar and tubular/cylindrical.

Non-Aqueous Interlayer Architecture

The non-aqueous interlayer architecture of the present invention is provided in an electrochemical cell structure, the structure having an anode composed of a material selected from the group consisting of active metal, active metal-ion, active metal alloy, active metal alloying and active metal intercalating material, and an ionically conductive protective architecture on a first surface of the anode. The architecture is composed of an active metal ion conducting separator layer with a non-aqueous anolyte, the separator layer being chemically compatible with the active metal and in contact with the anode, and a substantially impervious ionically conductive layer chemically compatible with the separator layer and aqueous environments and in contact with the separator layer. The separator layer may include a semi-permeable membrane, for example, a micro-porous polymer, such as are available from Celgard, Inc. Charlotte, N.C., impregnated with an organic anolyte.

The protective architecture of this invention incorporates a substantially impervious layer of an active metal ion conducting glass or glass-ceramic (e.g., a lithium ion conductive glass-ceramic (LIC-GC)) that has high active metal ion conductivity and stability to aggressive electrolytes that vigorously react with lithium metal, for example) such as aqueous electrolytes. Suitable materials are substantially impervious, ionically conductive and chemically compatible with aqueous electrolytes or other electrolyte (catholyte) and/or cathode materials that would otherwise adversely react with lithium metal, for example. Such glass or glass-ceramic materials are substantially gap-free, non-swellable and are inherently ionically conductive. That is, they do not depend on the presence of a liquid electrolyte or other agent for their ionically conductive properties. They also have high ionic conductivity, at least $10^{-7}$ S/cm, generally at least $10^{-6}$ S/cm, for example at least $10^{-5}$ S/cm to $10^{-4}$ S/cm, and as high as $10^{-3}$ S/cm or higher so that the overall ionic conductivity of the multi-layer protective structure is at least $10^{-7}$ S/cm and as high as $10^{-3}$ S/cm or higher. The thickness of the layer is preferably about 0.1 to 1000 microns, or, where the ionic conductivity of the layer is about $10^{-7}$ S/cm, about 0.25 to 1 micron, or, where the ionic conductivity of the layer is between about $10^{-4}$ about $10^{-3}$ S/cm, about 10 to 1000 microns, preferably between 1 and 500 microns, and more preferably between 10 and 100 microns, for example 20 microns.

Suitable examples of suitable substantially impervious lithium ion conducting layers include glassy or amorphous metal ion conductors, such as a phosphorus-based glass, oxide-based glass, phosphorus-oxynitride-based glass, sulpher-based glass, oxide/sulfide based glass, selenide based glass, gallium based glass, germanium-based glass or boracite glass (such as are described D. P. Button et al., Solid State Ionics, Vols. 9-10, Part 1, 585-592 (December 1983); ceramic active metal ion conductors, such as lithium beta-alumina, sodium beta-alumina, Li superionic conductor (LISICON), Na superionic conductor (NASICON), and the like; or glass-ceramic active metal ion conductors. Specific examples include LiPON, $Li_3PO_4.Li_2S.SiS_2$, $Li_2S.GeS_2.Ga_2S_3$, $Li_2O.11Al_2O_3$, $Na_2O.11Al_2O_3$, $(Na, Li)_{1+x}Ti_{2-x}Al_x(PO_4)_3$ ($0.6 \leq x \leq 0.9$) and crystallographically related structures, $Na_3Zr_2Si_2PO_{12}$, $Li_3Zr_2Si_2PO_{12}$, $Na_5ZrP_3O_{12}$, $Na_5TiP_3O_{12}$, $Na_3Fe_2P_3O_{12}$, $Na_4NbP_3O_{12}$, $Li_5ZrP_3O_{12}$, $Li_5TiP_3O_{12}$, $Li_3Fe_2P_3O_{12}$ and $Li_4NbP_3O_{12}$, and combinations thereof, optionally sintered or melted. Suitable ceramic ion active metal ion conductors are described, for example, in U.S. Pat. No. 4,985,317 to Adachi et al., incorporated by reference herein in its entirety and for all purposes.

A particularly suitable glass-ceramic material for the substantially impervious layer of the protective architecture is a lithium ion conductive glass-ceramic having the following composition:

| Composition | mol % |
| --- | --- |
| $P_2O_5$ | 26-55% |
| $SiO_2$ | 0-15% |
| $GeO_2 + TiO_2$ | 25-50% |
| in which   $GeO_2$ | 0-50% |
|   $TiO_2$ | 0-50% |
| $ZrO_2$ | 0-10% |
| $M_2O_3$ | 0-10% |
| $Al_2O_3$ | 0-15% |
| $Ga_2O_3$ | 0-15% |
| $Li_2O$ | 3-25% | and containing a predominant crystalline phase composed of $Li_{1+x}(M, Al, Ga)_x(Ge_{1-y}Ti_y)_{2-x}(PO_4)_3$ where $X \leq 0.8$ and $0 \leq Y \leq 1.0$, and where M is an element selected from the group consisting of Nd, Sm, Eu, Gd, Tb, Dy, Ho, Er, Tm and Yb, and/or $Li_{1+x+y}Q_xTi_{2-x}Si_yP_{3-y}O_{12}$ where $0 < X \leq 0.4$ and $0 < Y \leq 0.6$, and where Q is Al or Ga. The glass-ceramics are obtained by melting raw materials to a melt, casting the melt to a glass and subjecting the glass to a heat treatment. Such materials are available from OHARA Corporation, Japan and are further described in U.S. Pat. Nos. 5,702,995, 6,030,909, 6,315,881 and 6,485,622, incorporated herein by reference.

Such lithium ion conductive substantially impervious layers and techniques for their fabrication and incorporation in battery cells are described in U.S. Provisional Patent Application No. 60/418,899, filed Oct. 15, 2002, titled IONICALLY CONDUCTIVE COMPOSITES FOR PROTECTION OF ANODES AND ELECTROLYTES, its corresponding U.S. patent application Ser. No. 10/686,189, filed Oct. 14, 2003, and titled IONICALLY CONDUCTIVE COMPOSITES FOR PROTECTION OF ACTIVE METAL ANODES, U.S. patent application Ser. No. 10/731,771, filed Dec. 5, 2003, and titled IONICALLY CONDUCTIVE COMPOSITES FOR PROTECTION OF ACTIVE METAL ANODES, and U.S. patent application Ser. No. 10/772,228, filed Feb. 3, 2004, and titled IONICALLY CONDUCTIVE MEMBRANES FOR PROTECTION OF ACTIVE METAL ANODES AND BATTERY CELLS. These applications are incorporated by reference herein in their entirety for all purposes.

A critical limitation in the use of these highly conductive glasses and glass-ceramics in lithium (or other active metal or active metal intercalation) batteries is their reactivity to lithium metal or compounds incorporating lithium with a potential near that (e.g., within about a volt) of lithium metal. The non-aqueous electrolyte interlayer of the present invention isolates the lithium (for example) electrode from reacting with the glass or glass-ceramic membrane. The non-aqueous interlayer may have a semi-permeable membrane, such as a Celgard micro-porous separator, to prevent mechanical contact of the lithium electrode to the glass or glass-ceramic membrane. The membrane is impregnated with organic liquid electrolyte (anolyte) with solvents such as ethylene carbonate (EC), propylene carbonate (PC), 1,2-dimethoxy ethane (DME),1,3-dioxolane (DIOX), or various ethers, glymes, lactones, sulfones, sulfolane, or mixtures thereof. It may also or alternatively have a polymer electrolyte, a gel-type electrolyte, or a combination of these. The important criteria are that the lithium electrode is stable in the non-aqueous anolyte, the non-aqueous anolyte is sufficiently conductive to $Li^+$ions, the lithium electrode does not directly contact the glass or glass-ceramic membrane, and the entire assembly allows lithium ions to pass through the glass or glass-ceramic membrane.

Referring to FIG. 1, a specific embodiment of the present invention is illustrated and described. FIG. 1 shows an unscaled depiction of an electrochemical cell structure 100 having an active metal, active metal-ion, active metal alloying metal, or active metal intercalating material anode 102 and an ionically conductive protective architecture 104. The protective architecture 104 has an active metal ion conducting separator layer 106 with a non-aqueous anolyte (sometimes also referred to as a transfer electrolyte) on a surface of the anode 102 and a substantially impervious ionically conductive layer 108 in contact with the separator layer 106. The separator layer 106 is chemically compatible with the active metal and the substantially impervious layer 108 is chemically compatible with the separator layer 106 and aqueous environments. The structure 100 may optionally include a current collector 110, composed of a suitable conductive metal that does not alloy with or intercalate the active metal. When the active metal is lithium, a suitable current collector material is copper. The current collector 110 can also serve to seal the anode from ambient to prevent deleterious reaction of the active metal with ambient air or moisture.

The separator layer 106 is composed of a semi-permeable membrane impregnated with an organic anolyte. For example, the semi-permeable membrane may be a micro-porous polymer, such as are available from Celgard, Inc. The organic anolyte may be in the liquid or gel phase. For example, the anolyte may include a solvent selected from the group consisting of organic carbonates, ethers, lactones, sulfones, etc, and combinations thereof, such as EC, PC, DEC, DMC, EMC, 1,2-DME or higher glymes, THF, 2MeTHF, sulfolane, and combinations thereof 1,3-dioxolane may also be used as an anolyte solvent, particularly but not necessarily when used to enhance the safety of a cell incorporating the structure, as described further below. When the anolyte is in the gel phase, gelling agents such as polyvinylidine fluoride (PVdF) compounds, hexafluoropropylene-vinylidene fluoride copolymers (PVdf-HFP), polyacrylonitrile compounds, cross-linked polyether compounds, polyalkylene oxide compounds, polyethylene oxide compounds, and combinations and the like may be added to gel the solvents. Suitable anolytes will also, of course, also include active metal salts, such as, in the case of lithium, for example, $LiPF_6$, $LiBF_4$, $LiAsF_6$, $LiSO_3CF_3$ or $LiN(SO_2C_2F_5)_2$. One example of a suitable separator layer is 1M $LiPF_6$ dissolved in propylene carbonate and impregnated in a Celgard microporous polymer membrane.

There are a number of advantages of a protective architecture in accordance with the present invention. In particular, cell structures incorporating such an architecture may be relatively easily manufactured. In one example, lithium metal is simply placed against a micro-porous separator impregnated with organic liquid or gel electrolyte and with the separator adjacent to a glass/glass ceramic active metal ion conductor.

An additional advantage of the non-aqueous interlayer is realized when glass-ceramics are used. When amorphous glasses of the type described by the OHARA Corp. patents cited above are heat-treated, the glass devitrifies, leading to the formation of a glass-ceramic. However, this heat treatment can lead to the formation of surface roughness which may be difficult to coat using vapor phase deposition of an inorganic protective interlayer such as LiPON, $Cu_3N$, etc. The use of a liquid (or gel), non-aqueous electrolyte interlayer would easily cover such a rough surface by normal liquid flow, thereby eliminating the need for surface polishing, etc. In this sense, techniques such as "draw-down" (as described by Sony Corporation and Shott Glass (T. Kessler, H. Wegener, T. Togawa, M. Hayashi, and T. Kakizaki, "Large Microsheet Glass for 40-in. Class PALC Displays," 1997, FMC$_{2-3}$, downloaded from Shott Glass website; http://www.schott.com/english, incorporated herein by reference) could be used to form thin glass layers (20 to 100 microns), and these glasses heat treated to form glass-ceramics.

Battery Cells

Figure 2:
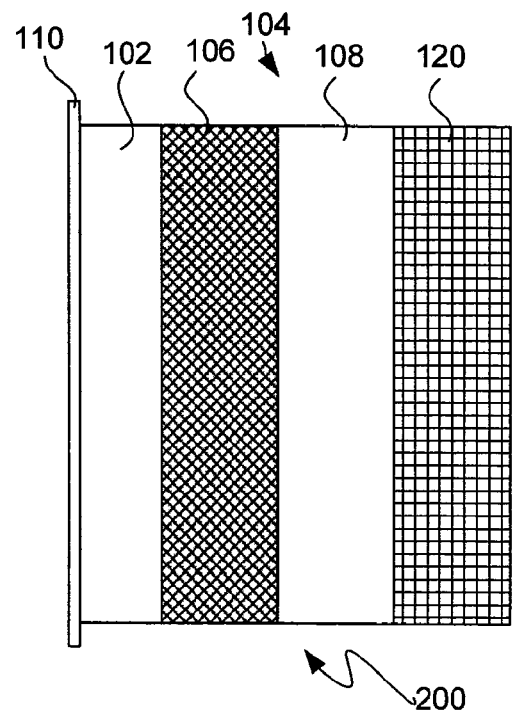
FIG. 2 is a schematic illustration of a battery cell incorporating an ionically conductive protective interlayer architecture in accordance with the present invention.

The non-aqueous interlayer architecture is usefully adopted in battery cells. For example, the electrochemical structure 100 of FIG. 1 can be paired with a cathode system 120 to form a cell 200, as depicted in FIG. 2. The cathode system 120 includes an electronically conductive component, an ionically conductive component, and an electrochemically active component. The cathode system 120 may have any desired composition and, due to the isolation provided by the protective architecture, is not limited by the anode or anolyte composition. In particular, the cathode system may incorporate components which would otherwise be highly reactive with the anode active metal, such as aqueous materials, including water, aqueous catholytes and air, metal hydride electrodes and metal oxide electrodes.

In one embodiment, a Celgard separator would be placed against one side of the thin glass-ceramic, followed by a non-aqueous liquid or gel electrolyte, and then a lithium electrode. On the other side of the glass ceramic membrane, an aggressive solvent could be used, such as an aqueous electrolyte. In such a way, an inexpensive Li/water or Li/air cell, for example, could be built.

Cathode Systems

As noted above, the cathode system 120 of a battery cell in accordance with the present invention may have any desired composition and, due to the isolation provided by the protective architecture, is not limited by the anode or anolyte composition. In particular, the cathode system may incorporate components which would otherwise be highly reactive with the anode active metal, such as aqueous materials, including water, aqueous solutions and air, metal hydride electrodes and metal oxide electrodes.

Battery cells of the present invention may include, without limitation, water, aqueous solutions, air electrodes and metal hydride electrodes, such as are described in application Ser. No. 10/772,157 titled ACTIVE METAL/AQUEOUS ELECTROCHEMICAL CELLS AND SYSTEMS, now U.S. Pat. No. 7,645,543, incorporated herein by reference in its entirety and for all purposes, and metal oxide electrodes, as used, for example, in conventional Li-ion cells.

The effective isolation between anode and cathode achieved by the protective interlayer architecture of the present invention also enables a great degree of flexibility in the choice of catholyte systems, in particular aqueous systems, but also non-aqueous systems. Since the protected anode is completely decoupled from the catholyte, so that catholyte compatibility with the anode is no longer an issue, solvents and salts which are not kinetically stable to Li can be used.

For cells using water as an electrochemically active cathode material, a porous electronically conductive support structure can provide the electronically conductive component of the cathode system. An aqueous electrolyte (catholyte) provides ion carriers for transport (conductivity) of Li ions and anions that combine with Li. The electrochemically active component (water) and the ionically conductive component (aqueous catholyte) will be intermixed as a single solution, although they are conceptually separate elements of the battery cell. Suitable catholytes for the Li/water battery cell of the invention include any aqueous electrolyte with suitable ionic conductivity. Suitable electrolytes may be acidic, for example, strong acids like HCl, $H_2SO_4$, $H_3PO_4$ or weak acids like acetic acid/Li acetate; basic, for example, LiOH; neutral, for example, sea water, LiCl, LiBr, LiI; or amphoteric, for example, $NH_4Cl$, $NH_4Br$, etc.

The suitability of sea water as an electrolyte enables a battery cell for marine applications with very high energy density. Prior to use, the cell structure is composed of the protected anode and a porous electronically conductive support structure (electronically conductive component of the cathode). When needed, the cell is completed by immersing it in sea water which provides the electrochemically active and ionically conductive components. Since the latter components are provided by the sea water in the environment, they need not transported as part of the battery cell prior to it use (and thus need not be included in the cell's energy density calculation). Such a cell is referred to as an "open" cell since the reaction products on the cathode side are not contained. Such a cell is, therefore, a primary cell.

Secondary Li/water cells are also possible in accordance with the invention. As noted above, such cells are referred to as "closed" cells since the reaction products on the cathode side are contained on the cathode side of the cell to be available to recharge the anode by moving the Li ions back across the protective membrane when the appropriate recharging potential is applied to the cell.

As noted above and described further below, in another embodiment of the invention, ionomers coated on the porous catalytic electronically conductive support reduce or eliminate the need for ionic conductivity in the electrochemically active material.

The electrochemical reaction that occurs in a Li/water cell is a redox reaction in which the electrochemically active cathode material gets reduced. In a Li/water cell, the catalytic electronically conductive support facilitates the redox reaction. As noted above, while not so limited, in a Li/water cell, the cell reaction is believed to be:

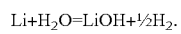
$$Li+H_2O=LiOH+½H_2.$$

The half-cell reactions at the anode and cathode are believed to be:

$$\text{Anode: } Li=Li^++e^-$$

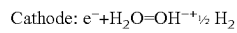
$$\text{Cathode: } e^-+H_2O=OH^-+½H_2$$

Accordingly, the catalyst for the Li/water cathode promotes electron transfer to water, generating hydrogen and hydroxide ion. A common, inexpensive catalyst for this reaction is nickel metal; precious metals like Pt, Pd, Ru, Au, etc. will also work but are more expensive.

Also considered to be within the scope of Li (or other active metal)/water batteries of this invention are batteries with a protected Li anode and an aqueous electrolyte composed of gaseous and/or solid oxidants soluble in water that can be used as active cathode materials (electrochemically active component). Use of water soluble compounds, which are stronger oxidizers than water, can significantly increase battery energy in some applications compared to the lithium/water battery, where during the cell discharge reaction, electrochemical hydrogen evolution takes place at the cathode surface. Examples of such gaseous oxidants are $O_2$, $SO_2$ and $NO_2$. Also, metal nitrites, in particular $NaNO_2$ and $KNO_2$ and metal sulfites such as $Na_2SO_3$ and $K_2SO_3$ are stronger oxidants than water and can be easily dissolved in large concentrations. Another class of inorganic oxidants soluble in water are peroxides of lithium, sodium and potassium, as well as hydrogen peroxide $H_2O_2$.

The use of hydrogen peroxide as an oxidant can be especially beneficial. There are at least two ways of utilizing hydrogen peroxide in a battery cell in accordance with the present invention. First of all, chemical decomposition of hydrogen peroxide on the cathode surface leads to production of oxygen gas, which can be used as active cathode material. The second, perhaps more effective way, is based on the direct electroreduction of hydrogen peroxide on the cathode surface. In principal, hydrogen peroxide can be reduced from either basic or acidic solutions. The highest energy density can be achieved for a battery utilizing hydrogen peroxide reduction from acidic solutions. In this case a cell with Li anode yields $E^0=4.82$ V (for standard conditions) compared to $E^0=3.05$ V for Li/Water couple. However, because of very high reactivity of both acids and hydrogen peroxide to unprotected Li, such cell can be practically realized only for protected Li anode such as in accordance with the present invention.

For cells using air as an electrochemically active cathode material, the air electrochemically active component of these cells includes moisture to provide water for the electrochemical reaction. The cells have an electronically conductive support structure electrically connected with the anode to allow electron transfer to reduce the air cathode active material. The electronically conductive support structure is generally porous to allow fluid (air) flow and either catalytic or treated with a catalyst to catalyze the reduction of the cathode active material. An aqueous electrolyte with suitable ionic conductivity or ionomer is also in contact with the electronically conductive support structure to allow ion transport within the electronically conductive support structure to complete the redox reaction.

The air cathode system includes an electronically conductive component (for example, a porous electronic conductor), an ionically conductive component with at least an aqueous constituent, and air as an electrochemically active component. It may be any suitable air electrode, including those conventionally used in metal (e.g., Zn)/air batteries or low temperature (e.g., PEM) fuel cells. Air cathodes used in metal/air batteries, in particular in Zn/air batteries, are described in many sources including "Handbook of Batteries" (Linden and T. B. Reddy, McGraw-Hill, NY, Third Edition) and are usually composed of several layers including an air diffusion membrane, a hydrophobic Teflon layer, a catalyst layer, and a metal electronically conductive component/current collector, such as a Ni screen. The catalyst layer also includes an ionically conductive component/electrolyte that may be aqueous and/or ionomeric. A typical aqueous electrolyte is composed of KOH dissolved in water. A typical ionomeric electrolyte is composed of a hydrated (water) Li ion conductive polymer such as a per-fluoro-sulfonic acid polymer film (e.g., du Pont NAFION). The air diffusion membrane adjusts the air (oxygen) flow. The hydrophobic layer prevents penetration of the cell's electrolyte into the air-diffusion membrane. This layer usually contains carbon and Teflon particles. The catalyst layer usually contains a high surface area carbon and a catalyst for acceleration of reduction of oxygen gas. Metal oxides, for example $MnO_2$, are used as the catalysts for oxygen reduction in most of the commercial cathodes. Alternative catalysts include metal macrocycles such as cobalt phthalocyanine, and highly dispersed precious metals such at platinum and platinum/ruthenium alloys. Since the air electrode structure is chemically isolated from the active metal electrode, the chemical composition of the air electrode is not constrained by potential reactivity with the anode active material. This can allow for the design of higher performance air electrodes using materials that would normally attack unprotected metal electrodes.

Another type of active metal/aqueous battery cell incorporating a protected anode and a cathode system with an aqueous component in accordance with the present invention is a lithium (or other active metal)/metal hydride battery. For example, lithium anodes protected with a non-aqueous interlayer architecture as described herein can be discharged and charged in aqueous solutions suitable as electrolytes in a lithium/metal hydride battery. Suitable electrolytes provide a source or protons. Examples include aqueous solutions of halide acids or acidic salts, including chloride or bromide acids or salts, for example HCl, HBr, $NH_4Cl$ or $NH_4Br$.

In addition to the aqueous, air, etc., systems noted above, improved performance can be obtained with cathode systems incorporating conventional Li-ion battery cathodes and electrolytes, such as metal oxide cathodes (e.g., $Li_xCoO_2$, $Li_xNiO_2$, $Li_xMn_2O_4$ and $LiFePO_4$) and the binary, ternary or multicomponent mixtures of alkyl carbonates or their mixtures with ethers as solvents for a Li metal salt (e.g., $LiPF_6$, $LiAsF_6$ or $LiBF_4$); or Li metal battery cathodes (e.g., elemental sulfur or polysulfides) and electrolytes composed of organic carbonates, ethers, glymes, lactones, sulfones, sulfolane, and combinations thereof, such as EC, PC, DEC, DMC, EMC, 1,2-DME, THF, 2MeTHF, and combinations thereof, as described, for example, in U.S. Pat. No. 6,376,123, incorporated herein by reference.

Moreover, the catholyte solution can be composed of only low viscosity solvents, such as ethers like 1,2-dimethoxy ethane (DME), tetrahydrofuran (THF), 2-methyltetrahydrofuran, 1,3-dioxolane (DIOX), 4-methyldioxolane (4-Me-DIOX) or organic carbonates like dimethylcarbonate (DMC), ethylmethylcarbonate (EMC), diethylcarbonate (DEC), or their mixtures. Also, super low viscosity ester solvents or co-solvents such as methyl formate and methyl acetate, which are very reactive to unprotected Li, can be used. As is known to those skilled in the art, ionic conductivity and diffusion rates are inversely proportional to viscosity such that all other things being equal, battery performance improves as the viscosity of the solvent decreases. The use of such catholyte solvent systems significantly improves battery performance, in particular discharge and charge characteristics at low temperatures.

Ionic liquids may also be used in catholytes of the present invention. Ionic liquids are organic salts with melting points under 100 degrees, often even lower than room temperature. The most common ionic liquids are imidazolium and pyridinium derivatives, but also phosphonium or tetralkylammonium compounds are also known. Ionic liquids have the desirable attributes of high ionic conductivity, high thermal stability, no measurable vapor pressure, and non-flammability. Representative ionic liquids are 1-Ethyl-3-methylimidazolium tosylate (EMIM-Ts), 1-Butyl-3-methylimidazolium octyl sulfate (BMIM-OctSO4), 1-Ethyl-3-methylimidazolium hexafluorophosphate, and 1-Hexyl-3-methylimidazolium tetrafluoroborate. Although there has been substantial interest in ionic liquids for electrochemical applications such as capacitors and batteries, they are unstable to metallic lithium and lithiated carbon. However, protected lithium anodes as described in this invention are isolated from direct chemical reaction, and consequently lithium metal batteries using ionic liquids are possible as an embodiment of the present invention. Such batteries should be particularly stable at elevated temperatures.

Safety Additives

As a safety measure, the non-aqueous interlayer architecture can incorporate a gelling/polymerizing agent that, when in contact with the reactive electrolyte (for example water), leads to the formation of an impervious polymer on the anode (e.g., lithium) surface. This safety measure is used for the case where the substantially impervious layer of the protective architecture (e.g., a glass or glass-ceramic membrane) cracks or otherwise breaks down and allows the aggressive catholyte to enter and approach the lithium electrode raising the possibility of a violent reaction between the Li anode and aqueous catholyte.

Such a reaction can be prevented by providing in the anolyte a monomer for a polymer that is insoluble or minimally soluble in water, for example dioxolane (Diox) (for example, in an amount of about 5-20% by volume) and in the catholyte a polymerization initiator for the monomer, for example, a protonic acid. A Diox based anolyte may be composed of organic carbonates (EC, PC, DEC, DMC, EMC), ethers (1,2-DME, THF, 2MeTHF, 1,3-dioxolane and others) and their mixtures. Anolyte comprising dioxolane as a main solvent (e.g., 50-100% by volume) and Li salt, in particular, $LiAsF_6$, $LiBF_4$, $LiSO_3CF_3$, $LiN(SO_2C_2F_5)_2$, is especially attractive. Diox is a good passivating agent for Li surface, and good cycling data for Li metal has been achieved in the Diox based electrolytes (see, e.g., U.S. Pat. No. 5,506,068). In addition to its compatibility with Li metal, Diox in combination with above-mentioned ionic salts forms highly conductive electrolytes. A corresponding aqueous catholyte contains a polymerization initiator for Diox that produces a Diox polymerization product (polydioxolane) that is not or is only minimally soluble in water.

If the membrane breaks down, the catholyte containing the dissolved initiator comes in direct contact with the Diox based anolyte, and polymerization of Diox occurs next to the Li anode surface. Polydioxolane, which is a product of Diox polymerization, has high resistance, so the cell shuts down. In addition, the Polydioxolane layer formed serves as a barrier preventing reaction between the Li surface and the aqueous catholyte. Diox can be polymerized with protonic acids dissolved in the catholyte. Also, the water soluble Lewis acids, in particular benbenzoyl cation, can serve this purpose.

Thus, improvement in cyclability and safety is achieved by the use of a dioxolane (Diox) based anolyte and a catholyte containing a polymerization initiator for Diox.

Active Metal Ion and Alloy Anodes

The invention pertains to batteries and other electrochemical structures having anodes composed of active metals, as described above. A preferred active metal electrode is composed of lithium (Li). Suitable anolytes for these structures and cells are described above.

The invention also pertains to electrochemical structures having active metal ion (e.g., lithium-carbon) or active metal alloy (e.g., Li—Sn) anodes. Some structures may initially have uncharged active metal ion intercalation materials (e.g., carbon) or alloying metals (e.g., tin (Sn)) that are subsequently charged with active metal or active metal ions. While the invention may be applicable to a variety of active metals, it is described herein primarily with reference to lithium, as an example.

Carbon materials commonly used in conventional Li-ion cells, in particular petroleum coke and mesocarbon microbead carbons, can be used as anode materials in Li-ion aqueous battery cells. Lithium alloys comprising one or several of the metals selected from the group including Ca, Mg, Sn, Ag, Zn, Bi, Al, Cd, Ga, In and Sb, preferably Al, Sn or Si, can also be used as anode materials for such a battery. In one particular embodiment the anode comprises Li, Cu and Sn.

Anolyte for such structures can incorporate supporting salts, for example, $LiPF_6$, $LiBF_4$, $LiAsF_6$, $LiClO_4$, $LiSO_3CF_3$, $LiN(CF_3SO_2)_2$ or $LiN(SO_2C_2F_5)_2$ dissolved in binary or ternary mixtures of non-aqueous solvents, for example, EC, PC, DEC, DMC, EMC, MA, MF, commonly used in conventional Li-ion cells. Gel-polymer electrolytes, for instance electrolytes comprising one of the above mentioned salts, a polymeric binder, such as PVdF, PVdF-HFP copolymer, PAN or PEO, and a plasticizer (solvent) such as EC, PC, DEC, DMC, EMC, THF, 2MeTHF, 1,2-DME and their mixtures, also can be used.

For batteries using these anodes, a suitable cathode structure may be added to the electrochemical structure on the other side of the protective architecture. The architecture enables Li-ion type cells using a number of exotic cathodes such as air, water, metal hydrides or metal oxides. For Li-ion aqueous battery cells, for example, aqueous catholyte can be basic, acidic or neutral and contains Li cations. One example of a suitable aqueous catholyte is 2 M LiCl, 1M HCl.

During the first charge of the battery with lithium-carbon lithium alloy anode, Li cations are transported from the catholyte through the protective architecture (including the anolyte) to the anode surface where the intercalation process takes place as in conventional Li-ion cells. In one embodiment, the anode is chemically or electrochemically lithiated ex-situ before cell assembly.

Cell Designs

Electrochemical structures and battery cells in accordance with the present invention may have any suitable geometry. For example, planar geometries may be achieved by stacking planar layers of the various components of the structures or cells (anode, interlayer, cathode, etc.) according to known battery cell fabrication techniques that are readily adaptable to the present invention given the description of the structure or cell components provided herein. These stacked layers may be configured as prismatic structures or cells.

Alternatively, the use of tubular glass or glass-ceramic electrolytes with a non-aqueous interlayer architecture allows for the construction of high surface area anodes with low seal area. As opposed to flat-plate design where the seal length increases with cell surface area, tubular construction utilizes an end seal where the length of the tube can be increased to boost surface area while the seal area is invariant. This allows for the construction of high surface area Li/water and Li/air cells that should have correspondingly high power density.

The use of a non-aqueous interlayer architecture in accordance with the present invention facilitates construction. An open-ended (with a seal) or close-ended glass or glass-ceramic (i.e., substantially impervious active metal ion conductive solid electrolyte) tube is partially filled with a non-aqueous organic electrolyte (anolyte or transfer electrolyte) as described above, for example such as is typically used in lithium primary batteries A lithium metal rod surrounded by some type of physical separator (e.g., a semi-permeable polymer film such as Celgard, Tonin, polypropylene mesh, etc.) having a current collector is inserted into the tube. A simple epoxy seal, glass-to-metal seal, or other appropriate seal is used to physically isolate the lithium from the environment.

The protected anode can then be inserted in a cylindrical air electrode to make a cylindrical cell, as shown in FIG. 3A. Or an array of anodes might be inserted into a prismatic air electrode, as shown in FIG. 3B.

This technology can also be used to build Li/water, Li/metal hydride or Li/metal oxide cells by substituting the air electrode with suitable aqueous, metal hydride or metal oxide cathode systems, as described herein above.

In addition to the use of lithium metal rods or wires (in capillary tubes), this invention can also be used to isolate a rechargeable $LiC_X$ anode from aqueous or otherwise corrosive environments. In this case, appropriate anolyte (transfer electrolyte) solvents are used in the tubular anode to form a passive film on the lithiated carbon electrode. This would allow the construction of high surface area Li-ion type cells using a number of exotic cathodes such as air, water, metal hydrides or metal oxides, for example, as shown in FIG. 3C.

EXAMPLES

The following examples provide details illustrating advantageous properties of Li metal and Li-ion aqueous battery cells in accordance with the present invention. These examples are provided to exemplify and more clearly illustrate aspects of the present invention and in no way intended to be limiting.

Example 1

Li/Seawater Cell

Figure 4:
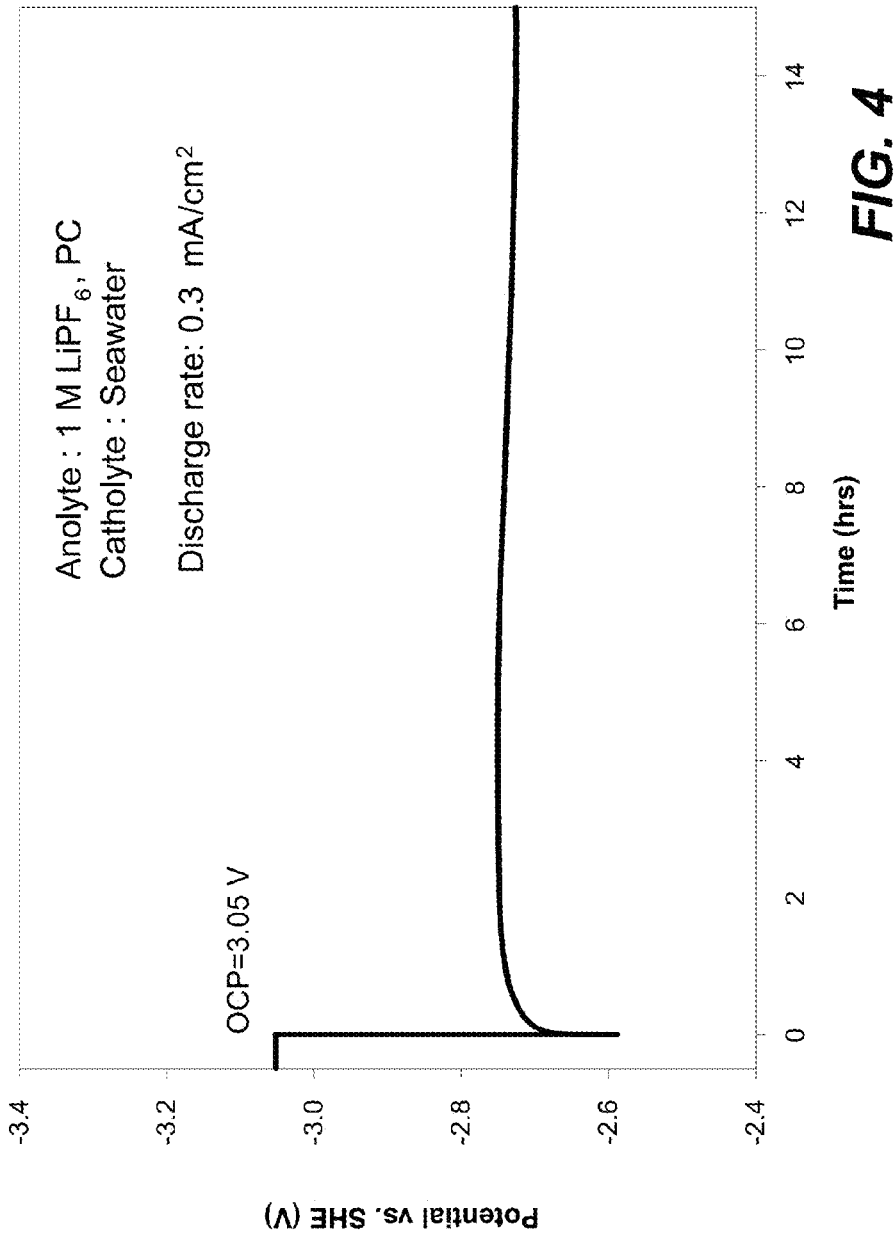
FIGS. 4-6 are plots of data illustrating the performance of various cells incorporating anodes with ionically conductive protective interlayer architecture in accordance with the present invention.

A series of experiments was performed in which the commercial ionically conductive glass-ceramic from OHARA Corporation was used as a membrane separating aqueous catholyte and non-aqueous anolyte. The cell structure was Li/non-aqueous electrolyte/glass-ceramic/aqueous electrolyte/Pt. A lithium foil from Chemetall Foote Corporation with thickness of 125 microns was used as the anode. The GLASS-CERAMIC plates were in the range of 0.3 to 0.48 mm in thickness. The GLASS-CERAMIC plate was fitted into an electrochemical cell by use of two o-rings such that the GLASS-CERAMIC plate was exposed to an aqueous environment from one side and a non-aqueous environment from the other side. In this case, the aqueous electrolyte comprised an artificial seawater prepared with 35 ppt of "Instant Ocean" from Aquarium Systems, Inc. The conductivity of the seawater was determined to be $4.5 \cdot 10^{-2}$ S/cm. A microporous Celgard separator placed on the other side of the GLASS-CERAMIC was filled with non-aqueous electrolyte comprised of 1M $LiPF_6$ dissolved in propylene carbonate. The loading volume of the nonaqueous electrolyte was 0.25 ml per 1 $cm^2$ of Li electrode surface. A platinum counter electrode completely immersed in the sea water catholyte was used to facilitate hydrogen reduction when the battery circuit was completed. An Ag/AgCl reference electrode was used to control potential of the Li anode in the cell. Measured values were recalculated into potentials in the Standard Hydrogen Electrode (SHE) scale. An open circuit potential (OCP) of 3.05 volts corresponding closely to the thermodynamic potential difference between $Li/Li^+$ and $H_2/H^+$ in water was observed (FIG. 4). When the circuit was closed, hydrogen evolution was seen immediately at the Pt electrode, which was indicative of the anode and cathode electrode reactions in the cell, $2Li=2Li+2e^-$ and $2H^++2e^-=H_2$. The potential-time curve for Li anodic dissolution at a discharge rate of 0.3 $mA/cm^2$ is presented in FIG. 2. The results indicate an operational cell with a stable discharge voltage. It should be emphasized that in all experiments using a Li anode in direct contact with seawater utilization of Li was very poor, and such batteries could not be used at all at low and moderate current densities similar to those used in this example due to the extremely high rate of Li corrosion in seawater (over 19 $A/cm^2$).

Example 2

Li/Air Cell

The cell structure was similar to that in the previous example, but instead of a Pt electrode completely immersed in the electrolyte, this experimental cell had an air electrode made for commercial Zn/Air batteries. An aqueous electrolyte used was 1M LiOH. A Li anode and a non-aqueous electrolyte were the same as described in the previous example.

Figure 5:
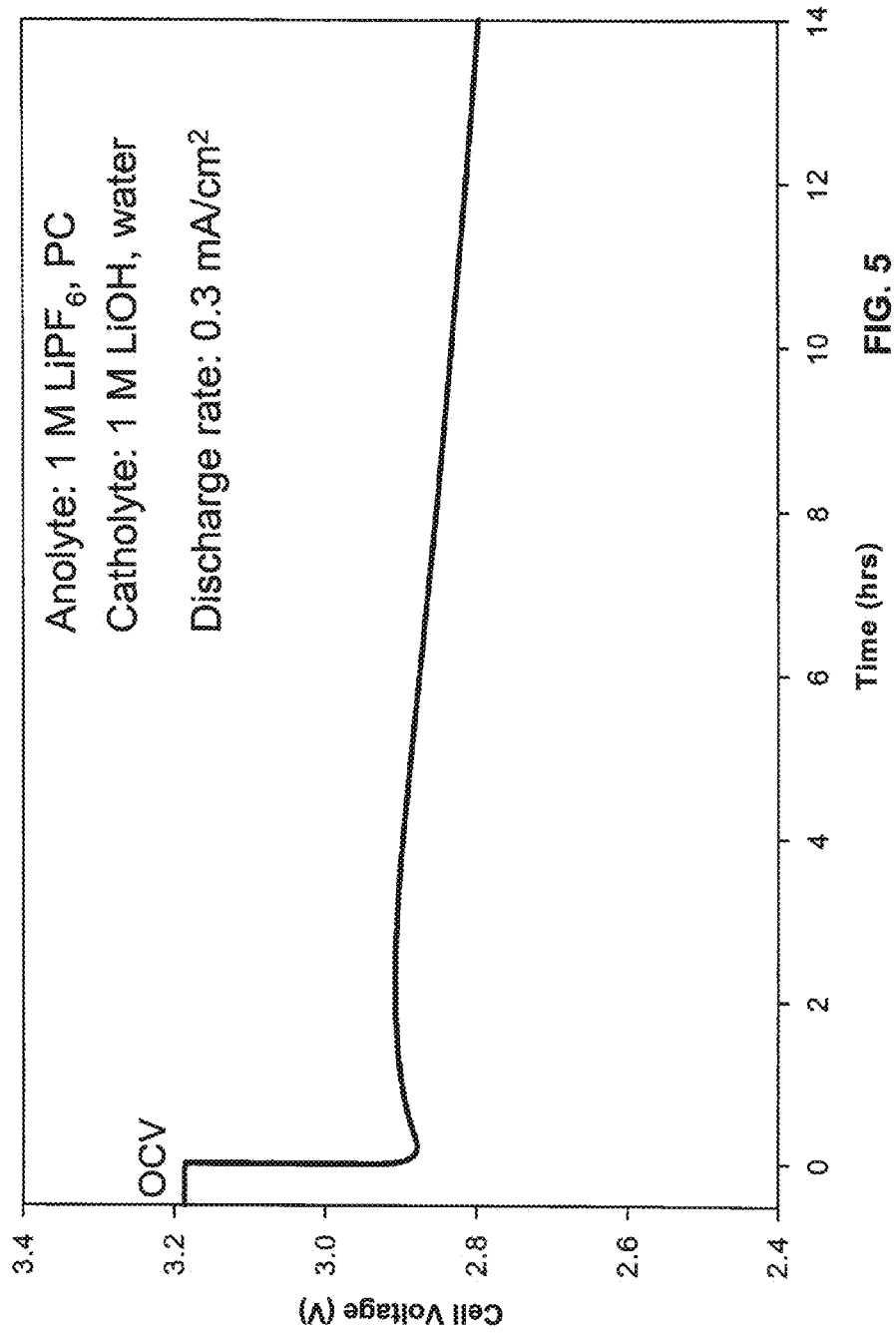

An open circuit potential of 3.2 V was observed for this cell. FIG. 5 shows discharge voltage-time curve at discharge rate of 0.3 $mA/cm^2$. The cell exhibited discharge voltage of 2.8-2.9 V. for more than 14 hrs. This result shows that good performance can be achieved for Li/air cells with solid electrolyte membrane separating aqueous catholyte and non-aqueous anolyte.

Example 3

Li-ion Cell

Figure 6:
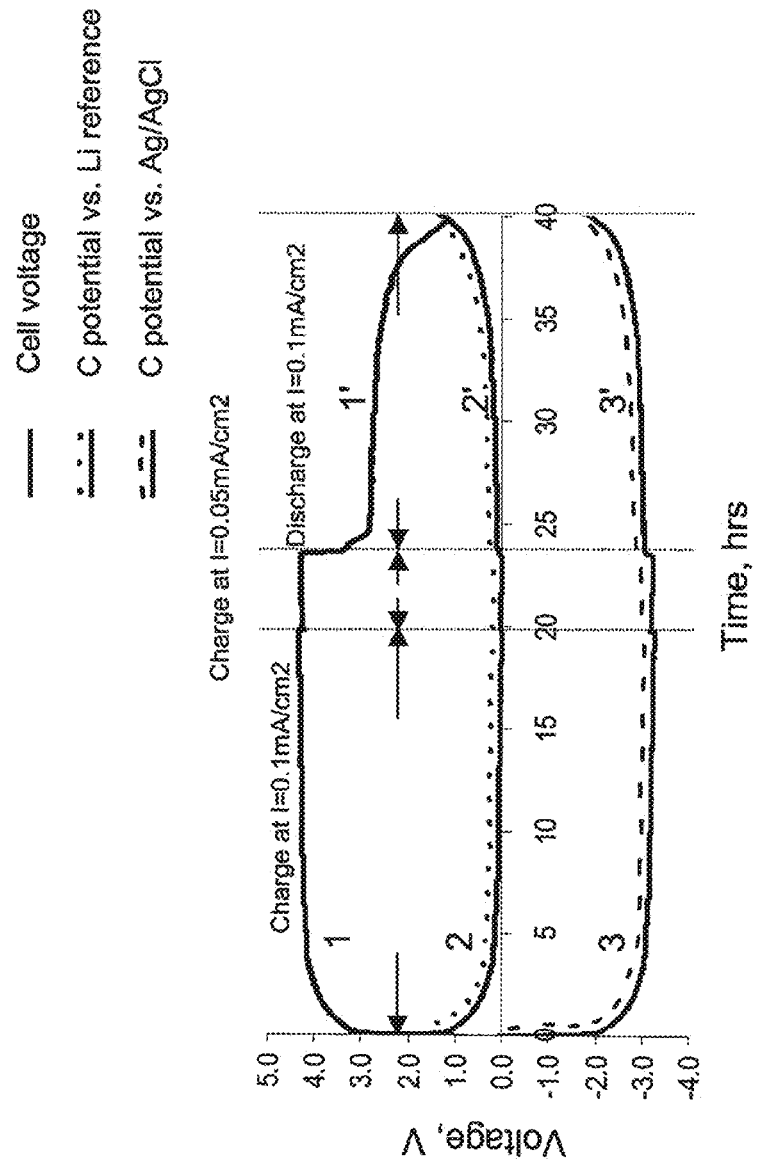

In these experiments the commercial ionically conductive glass-ceramic from OHARA Corporation was used as a membrane separating aqueous catholyte and non-aqueous anolyte. The cell structure was carbon/non-aqueous electrolyte/glass-ceramic plate/aqueous electrolyte/Pt. A commercial carbon electrode on copper substrate comprising a synthetic graphite similar to carbon electrodes commonly used in lithium-ion batteries was used as the anode. The thickness of the glass-ceramic plate was 0.3 mm. The glass-ceramic plate was fitted into an electrochemical cell by use of two o-rings such that the glass-ceramic plate was exposed to an aqueous environment from one side and a non-aqueous environment from the other side. The aqueous electrolyte comprised 2 M LiCl and 1M HCl. Two layers of microporous Celgard separator placed on the other side of the glass-ceramic were filled with non-aqueous electrolyte comprised of 1 M $LiPF_6$ dissolved in the mixture of ethylene carbonate and dimethyl carbonate (1:1 by volume). A lithium wire reference electrode was placed between two layers of Celgard separator in order to control the potential of the carbon anode during cycling. A platinum mesh completely immersed in the 2 M LiCl, 1 M HCl solution was used as the cell cathode. An Ag/AgCl reference electrode placed in the aqueous electrolyte was used to control potential of the carbon electrode and voltage drop across the GLASS-CERAMIC plate, as well as potential of the Pt cathode during cycling. An open circuit voltage (OCV) around 1 volt was observed for this cell. The voltage difference of 3.2 volts between Li reference electrode and Ag/AgCl reference electrode closely corresponding to the thermodynamical value was observed. The cell was charged at 0.1 mA/cm2 until the carbon electrode potential reached 5 mV vs. Li reference electrode, and then at 0.05 $mA/cm^2$ using the same cutoff potential. The discharge rate was 0.1 $mA/cm^2$, and discharge cutoff potential for the carbon anode was 1.8 V vs. Li reference electrode. The data in FIG. 6 show that the cell with intercalation carbon anode and aqueous electrolyte containing Li cations can work reversibly. This is the first known example where aqueous solution has been used in Li-ion cell instead of solid lithiated oxide cathode as a source of Li ions for charging of the carbon anode.

Alternative Embodiment—Li/Water Battery and Hydrogen Generator for Fuel Cell

The use of protective architecture on active metal electrodes in accordance with the present invention allows the construction of active metal/water batteries that have negligible corrosion currents, described above. The Li/water battery has a very high theoretical energy density of 8450 Wh/kg. The cell reaction is $Li+H_2O=LiOH+½ H_2$. Although the hydrogen produced by the cell reaction is typically lost, in this embodiment of the present invention it is used to provide fuel for an ambient temperature fuel cell. The hydrogen produced can be either fed directly into the fuel cell or it can be used to recharge a metal hydride alloy for later use in a fuel cell. At least one company, Millenium Cell <<http://www.millenniumcell.com/news/tech.html>> makes use of the reaction of sodium borohydride with water to produce hydrogen. However, this reaction requires the use of a catalyst, and the energy produced from the chemical reaction of $NaBH_4$ and water is lost as heat.

$$NaBH_4 + 2H_2O \rightarrow 4H_2 + NaBO_2$$

When combined with the fuel cell reaction, $H_2 + O_2 = H_2O$, the full cell reaction is believed to be:

$$NaBH_4 + 2O_2 \rightarrow 2H_2O + NaBO_2$$

The energy density for this system can be calculated from the equivalent weight of the $NaBH_4$ reactant (38/4=9.5 grams/equiv.). The gravimetric capacity of $NaBH_4$ is 2820 mAh/g; since the voltage of the cell is about 1, the specific energy of this system is 2820 Wh/kg. If one calculates the energy density based on the end product $NaBO_2$, the energy density is lower, about 1620 Wh/kg.

In the case of the Li/water cell, the hydrogen generation proceeds by an electrochemical reaction believed described by:

$$Li + H_2O = LiOH + \tfrac{1}{2}H_2$$

Figure 7:
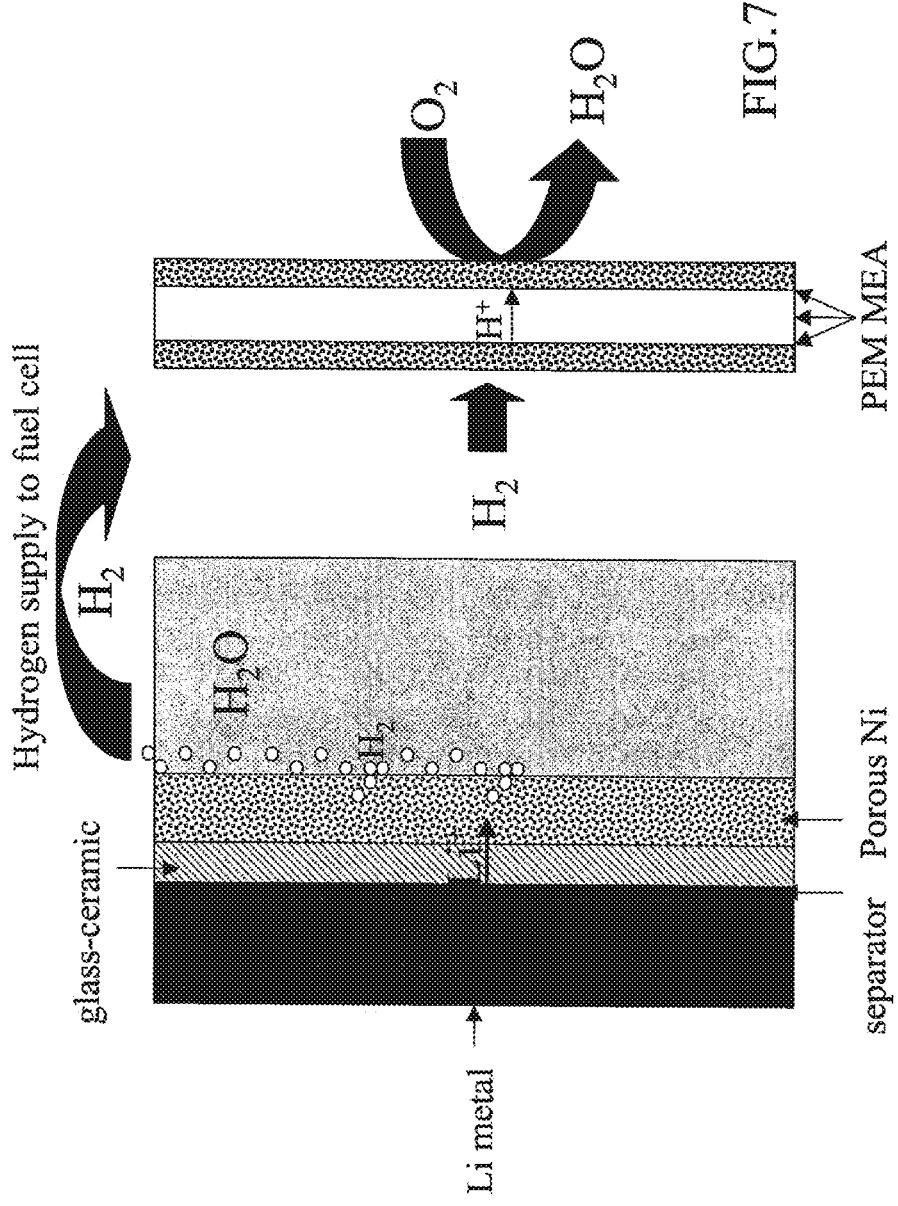
FIG. 7 illustrates a Li/water battery and hydrogen generator for a fuel cell in accordance with one embodiment of the present invention.

In this case, the energy of the chemical reaction is converted to electrical energy in a 3 volt cell, followed by conversion of the hydrogen to water in a fuel cell, giving an overall cell reaction believed described by:

$$Li + \tfrac{1}{2}H_2O + \tfrac{1}{4}O_2 = LiOH$$

where all the chemical energy is theoretically converted to electrical energy. The energy density based on the lithium anode is 3830 mAh/g at a cell potential of about 3 volts which is 11,500 Wh/kg (4 times higher than $NaBH_4$). If one includes the weight of water needed for the reaction, the energy density is then 5030 Wh/kg. If the energy density is based on the weight of the discharge product, LiOH, it is then 3500 Wh/kg, or twice the energy density of the $NaBO_2$ system. This can be compared to previous concepts where the reaction of lithium metal with water to produce hydrogen has also been considered. In that scenario the energy density is lowered by a factor of three, since the majority of the energy in the $Li/H_2O$ reaction is wasted as heat, and the energy density is based on a cell potential for the $H_2/O_2$ couple (as opposed to 3 for $Li/H_2O$) which in practice is less than one. In this embodiment of the present invention, illustrated in FIG. 7, the production of hydrogen can also be carefully controlled by load across the Li/water battery, the Li/water battery has a long shelf life due to the protective membrane, and the hydrogen leaving the cell is already humidified for use in the $H_2$/air fuel cell.

Conclusion

Although the foregoing invention has been described in some detail for purposes of clarity of understanding, it will be apparent that certain changes and modifications may be practiced within the scope of the invention. In particular, while the invention is primarily described with reference to a lithium metal, alloy or intercalation anode, the anode may also be composed of any active metal, in particular, other alkali metals, such as sodium. It should be noted that there are many alternative ways of implementing both the process and compositions of the present invention. Accordingly, the present embodiments are to be considered as illustrative and not restrictive, and the invention is not to be limited to the details given herein.

All references cited herein are incorporated by reference for all purposes.

What is claimed is:

1. A method of making an electrochemical cell structure, comprising:
   providing an active metal anode component;
   providing an ionically conductive protective architecture component, the protective architecture component comprising,
   an active metal ion conducting separator layer comprising a semi-permeable polymer membrane comprising a non-aqueous anolyte, the separator layer being chemically compatible with the active metal, and
   a substantially impervious ionically conductive layer chemically compatible with the separator layer; and
   assembling the components such that the separator layer of the protective architecture component is in contact with a first surface of the anode component.

2. The method of claim 1, wherein the active metal anode component is an active lithium anode, and further wherein the protective architecture component is conductive to lithium ions.

3. The method of claim 2, wherein the active lithium anode is selected from the group consisting of lithium metal, lithium alloy and lithium intercalating material.

4. The method of claim 3, wherein the active lithium anode is lithium metal.

5. The method of claim 3, wherein the active lithium anode comprises a lithium intercalating material.

6. The method of claim 5, wherein the lithium intercalating material comprises intercalatable carbon.

7. The method of claim 3, wherein the active lithium anode comprises a lithium silicon alloy.

8. The method of claim 2, wherein the substantially impervious layer is a glass.

9. The method of claim 2, wherein the substantially impervious layer is a ceramic.

10. The method of claim 2, wherein the substantially impervious layer is a glass-ceramic.

11. The method of claim 2, wherein the substantially impervious layer has a thickness in the range of 10 to 1000 microns.

12. The method of claim 2, wherein the substantially impervious layer has a lithium ion conductivity of at least $10^{-5}$ S/cm 13. The method of claim 2, wherein the anolyte is a liquid phase lithium ion conductor.

14. The method of claim 2, wherein the anolyte is a gel phase lithium ion conductor.

15. The method of claim 1, wherein the active metal is lithium, the substantially impervious layer has a thickness in the range of 10-1000 microns.

16. The method of claim 15, wherein the substantially impervious layer has a thickness in the range of 10-1000 microns.

17. The method of claim 16, wherein the substantially impervious layer has a lithium ion conductivity of at least $10^{-5}$ S/cm.

18. The method of claim 17, wherein the anolyte comprises a liquid phase lithium ion conductor.

19. The method of claim 18, wherein the substantially impervious layer is a ceramic lithium ion conductor.

20. The method of claim 18, wherein the substantially impervious layer is a glass-ceramic.

* * * * *